(12) United States Patent
Noda et al.

(10) Patent No.: US 11,077,914 B2
(45) Date of Patent: Aug. 3, 2021

(54) BICYCLE DRIVE UNIT

(71) Applicant: Shimano Inc., Osaka (JP)

(72) Inventors: Shinichiro Noda, Osaka (JP); Yoshinori Iino, Osaka (JP); Takuya Edamura, Osaka (JP); Kento Mitsuyasu, Osaka (JP); Takaaki Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 321 days.

(21) Appl. No.: 16/157,357

(22) Filed: Oct. 11, 2018

(65) Prior Publication Data
US 2019/0111998 A1     Apr. 18, 2019

(30) Foreign Application Priority Data

Oct. 13, 2017   (JP) .............................. JP2017-199776

(51) Int. Cl.
| | |
|---|---|
| *B62M 6/55* | (2010.01) |
| *B62K 19/40* | (2006.01) |
| *B62K 19/34* | (2006.01) |
| *B62M 11/02* | (2006.01) |
| *B62M 11/14* | (2006.01) |
| *F16H 3/66* | (2006.01) |
| *F16H 37/04* | (2006.01) |

(Continued)

(52) U.S. Cl.
CPC ............... *B62M 6/55* (2013.01); *B62K 19/34* (2013.01); *B62K 19/40* (2013.01); *B62M 9/10* (2013.01); *B62M 11/02* (2013.01); *B62M 11/145* (2013.01); *F16H 1/14* (2013.01); *F16H 3/66* (2013.01); *F16H 37/04* (2013.01)

(58) Field of Classification Search
CPC ......... B62D 55/10; B62D 55/12; B62D 55/24
USPC ................................................. 180/9.1, 9.62
See application file for complete search history.

(56) References Cited

U.S. PATENT DOCUMENTS

| | | | |
|---|---|---|---|
| 5,570,752 | A | 11/1996 | Takata |
| 5,829,546 | A | 11/1998 | Tseng |

(Continued)

FOREIGN PATENT DOCUMENTS

| | | |
|---|---|---|
| CH | 593 822 A5 | 12/1977 |
| CN | 2306946 Y | 2/1999 |

(Continued)

OTHER PUBLICATIONS

Wikipedia—www.wikipedia.com, Bevel gear (2021) (Year: 2021).*
Vectorworks—http://app-help.vectorworks.net/2019/ (Year: 2021).*

*Primary Examiner* — Minnah L Seoh
*Assistant Examiner* — Felicia L. Brittman
(74) *Attorney, Agent, or Firm* — Global IP Counselors, LLP

(57) ABSTRACT

A bicycle drive unit includes a housing, crankshaft and a propulsion assist motor. The housing is configured to be mounted on a frame of a bicycle. The housing includes a first portion and a second portion. The crankshaft is provided to the first portion of the housing. The propulsion assist motor is provided to the second portion of the housing and configured to assist propulsion of the bicycle. The propulsion assist motor includes a rotational axis extending in a direction intersecting a direction in which the crankshaft extends. The second portion has a maximum dimension of smaller than or equal to 75 mm in a direction orthogonal to the rotational axis of the propulsion assist motor.

28 Claims, 14 Drawing Sheets

(51) Int. Cl.
    *B62M 9/10*     (2006.01)
    *F16H 1/14*     (2006.01)

(56) References Cited

U.S. PATENT DOCUMENTS

| | | | |
|---|---|---|---|
| 5,845,727 A | 12/1998 | Miyazawa et al. | |
| 6,080,073 A | 6/2000 | Liu et al. | |
| 6,230,586 B1 * | 5/2001 | Chang | B62M 6/55 |
| | | | 180/206.4 |
| 6,263,993 B1 | 7/2001 | Lin | |
| 6,276,479 B1 | 8/2001 | Suzuki et al. | |
| 6,554,730 B1 | 4/2003 | Sakai et al. | |
| 7,284,631 B2 * | 10/2007 | Rizzetto | B62M 6/55 |
| | | | 180/206.4 |
| 8,418,584 B2 | 4/2013 | Huang | |
| 8,678,417 B1 | 3/2014 | Chang | |
| 9,120,532 B2 | 9/2015 | Huang | |
| 9,227,695 B2 * | 1/2016 | Liu | B62K 19/34 |
| 9,616,969 B2 | 4/2017 | MacMartin | |
| 10,137,954 B2 * | 11/2018 | Hendey | B62J 1/08 |
| 2006/0208450 A1 | 9/2006 | Rizzetto | |
| 2014/0196970 A1 | 7/2014 | Biechele | |
| 2016/0303961 A1 | 10/2016 | Hendey et al. | |
| 2017/0106941 A1 | 4/2017 | Cheng et al. | |

FOREIGN PATENT DOCUMENTS

| | | |
|---|---|---|
| DE | 30 18 333 A1 | 11/1980 |
| DE | 198 19 705 A1 | 11/1999 |
| DE | 20 2004 014 189 U1 | 12/2004 |
| DE | 10 2013 224 668 A1 | 6/2015 |
| DE | 20 2017 103 331 U1 | 10/2017 |
| EP | 0 755 854 A1 | 1/1997 |
| EP | 0 697 330 B1 | 5/1997 |
| EP | 0 700 825 B1 | 8/1997 |
| EP | 0 816 215 A1 | 1/1998 |
| EP | 0 820 925 A1 | 1/1998 |
| EP | 0 636 538 B1 | 2/1998 |
| EP | 0 822 133 A1 | 2/1998 |
| EP | 0 700 826 B1 | 7/1998 |
| EP | 0 686 548 B1 | 9/1998 |
| EP | 0 861 770 A1 | 9/1998 |
| EP | 0 636 537 B1 | 6/1999 |
| EP | 0 569 954 B1 | 10/2000 |
| EP | 1 070 660 A1 | 1/2001 |
| EP | 0 816 215 B1 | 10/2002 |
| EP | 1 878 650 B1 | 12/2008 |
| JP | 1-186487 A | 7/1989 |
| JP | 5-238461 A | 9/1993 |
| JP | 7-40878 A | 2/1995 |
| JP | 7-309283 A | 11/1995 |
| JP | 8-11772 A | 1/1996 |
| JP | 8-34384 A | 2/1996 |
| JP | 8-34385 A | 2/1996 |
| JP | 8-53094 A | 2/1996 |
| JP | 8-72781 A | 3/1996 |
| JP | 8-80889 A | 3/1996 |
| JP | 2506047 B2 | 4/1996 |
| JP | 8-156870 A | 6/1996 |
| JP | 8-175470 A | 7/1996 |
| JP | 8-175472 A | 7/1996 |
| JP | 8-182210 A | 7/1996 |
| JP | 8-276887 A | 10/1996 |
| JP | 9-2368 A | 1/1997 |
| JP | 9-11970 A | 1/1997 |
| JP | 9-104386 A | 4/1997 |
| JP | 9-138168 A | 5/1997 |
| JP | 2647112 B2 | 5/1997 |
| JP | 9-142368 A | 6/1997 |
| JP | 9-142370 A | 6/1997 |
| JP | 10-16870 A | 1/1998 |
| JP | 10-16872 A | 1/1998 |
| JP | 10-16873 A | 1/1998 |
| JP | 10-16874 A | 1/1998 |
| JP | 10-24886 A | 1/1998 |
| JP | 10-114292 A | 5/1998 |
| JP | 10-114293 A | 5/1998 |
| JP | 10-114294 A | 5/1998 |
| JP | 10-119872 A | 5/1998 |
| JP | 10-147281 A | 6/1998 |
| JP | 10-147282 A | 6/1998 |
| JP | 10-316081 A | 12/1998 |
| JP | 11-91675 A | 4/1999 |
| JP | 2906023 B2 | 4/1999 |
| JP | 11-227669 A | 8/1999 |
| JP | 2967391 B2 | 8/1999 |
| JP | 2000-238675 A | 9/2000 |
| JP | 3138795 B2 | 12/2000 |
| JP | 2002-193180 A | 7/2002 |
| JP | 3417147 B2 | 4/2003 |
| JP | 3468843 B2 | 9/2003 |
| JP | 3468853 B2 | 9/2003 |
| JP | 3472375 B2 | 9/2003 |
| JP | 3588489 B2 | 8/2004 |
| JP | 3602824 B2 | 10/2004 |
| JP | 3617728 B2 | 11/2004 |
| JP | 3617729 B2 | 11/2004 |
| JP | 3706172 B2 | 8/2005 |
| JP | 3818462 B2 | 6/2006 |
| JP | 4056130 B2 | 12/2007 |
| JP | 2009-248668 A | 10/2009 |
| JP | 2014-19181 A | 2/2014 |
| WO | 2017/033008 A1 | 3/2017 |

\* cited by examiner

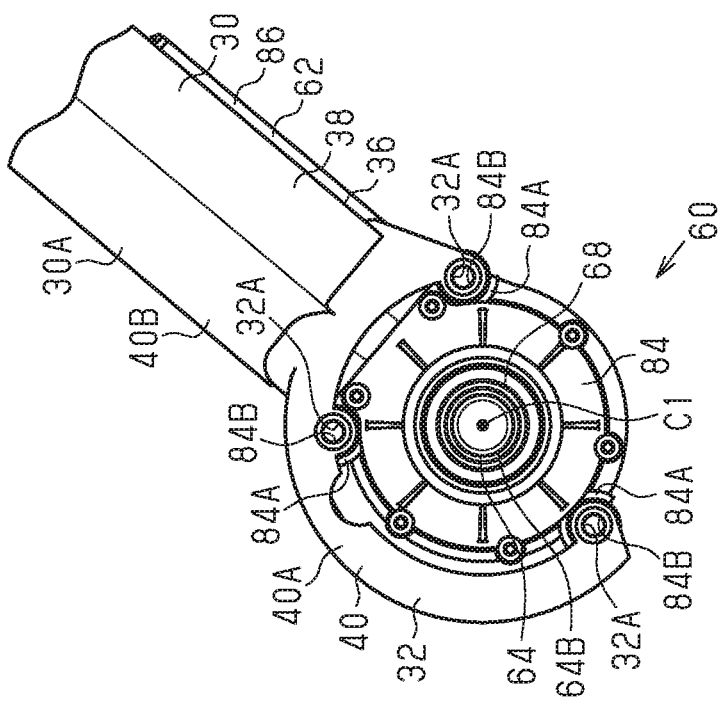
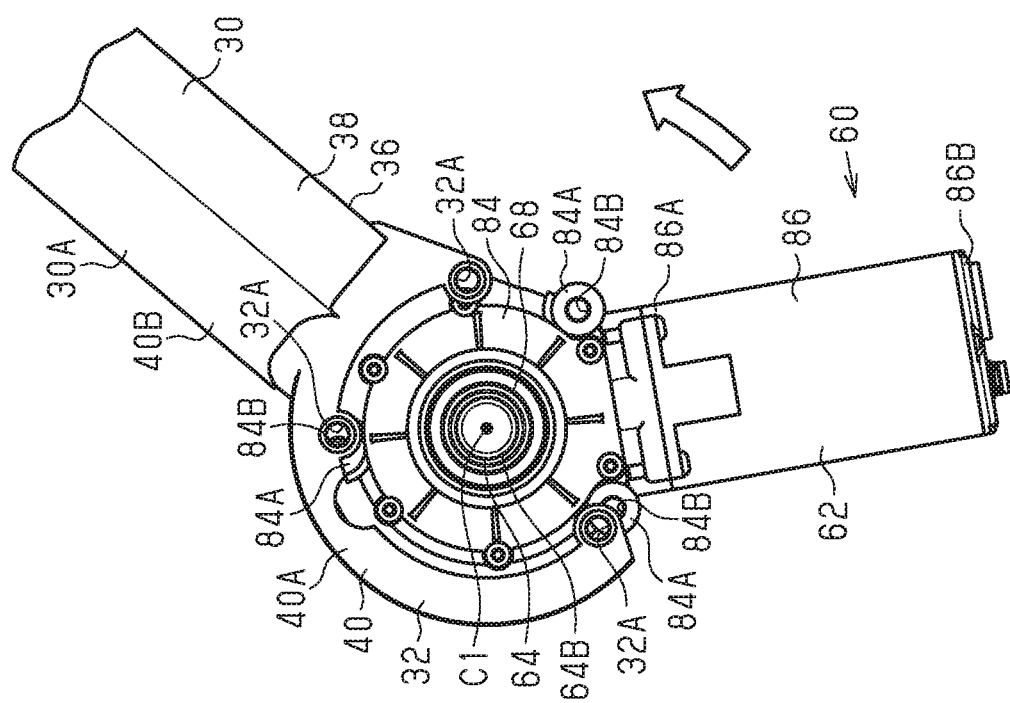

BICYCLE DRIVE UNIT

CROSS-REFERENCE TO RELATED APPLICATIONS

This application claims priority to Japanese Patent Application No. 2017-199776, filed on Oct. 13, 2017. The entire disclosure of Japanese Patent Application No. 2017-199776 is hereby incorporated herein by reference.

BACKGROUND

Field of the Invention

The present disclosure generally relates to a bicycle drive unit.

Background Information

Some bicycles are provided with a bicycle drive system that assists in propulsion of the bicycle. For example, Japanese Laid-Open Patent Publication No 2014-19181 (Patent document 1) discloses a bicycle drive system in which a bicycle drive unit includes a housing mounted on a frame of a bicycle, a crankshaft provided to the housing, and a motor provided on the housing to assist propulsion of the bicycle.

SUMMARY

In some bicycle drive units, the rotational axis of the propulsion assist motor is parallel to the rotational axis of the crankshaft. Thus, in a direction parallel to the rotational axis of the crankshaft, it is difficult to reduce the size of the bicycle drive unit at the portion where the propulsion assist motor is provided.

One object of the present disclosure is to provide a bicycle drive unit that allows the portion where the propulsion assist motor is provided to be reduced in size in a direction parallel to the rotational axis of the crankshaft.

A bicycle drive unit in accordance with a first aspect of the present disclosure includes a housing, a crankshaft and a propulsion assist motor. The housing is configured to be mounted on a frame of a bicycle. The housing includes a first portion and a second portion. The crankshaft is provided to the first portion of the housing. The propulsion assist motor is provided the second portion of in the housing. The propulsion assist motor includes a rotational axis extending in a direction intersecting a direction in which the crankshaft extends. The second portion has a maximum dimension of smaller than or equal to 75 mm in a direction orthogonal to the rotational axis of the propulsion assist motor. In accordance with the first aspect, the rotational axis of the propulsion assist motor extends in a direction intersecting the direction in which the crankshaft extends. Thus, in a direction parallel to the rotational axis of the crankshaft, the second portion where the propulsion assist motor is provided can be reduced in size. Further, the dimension of the second portion in the direction orthogonal to the rotational axis of the propulsion assist motor can be set to be smaller than or equal to 75 mm.

In accordance with a second aspect of the present disclosure, in the bicycle drive unit according to the first aspect, the housing is configured to be accommodated in at least a part of the frame. In accordance with the second aspect, the interior of the frame is effectively used, and the integrity in the outer appearance of the bicycle drive unit and the frame is improved.

In accordance with a third aspect of the present disclosure, the bicycle drive unit according to the first or second aspect is configured so that the second portion has a minimum dimension of larger than or equal to 40 mm in a direction orthogonal to the rotational axis of the propulsion assist motor. In accordance with the third aspect, the space in which the propulsion assist motor is arranged does not become too small because of the dimension of the second portion being smaller than 40 mm in the direction orthogonal to the rotational axis of the propulsion assist motor.

In accordance with a fourth aspect of the present disclosure, in the bicycle drive unit according to the third aspect, the second portion has a first dimension in a first direction differs from a second dimension in a second direction extending perpendicular to the first direction on a plane orthogonal to the rotational axis of the propulsion assist motor. In accordance with the fourth aspect, the dimensions of the second portion differ in the first direction and the second direction on the plane orthogonal to the rotational axis of the propulsion assist motor.

In accordance with a fifth aspect of the present disclosure, the bicycle drive unit according to the fourth aspect is configured so that the first direction is parallel to the direction in which the crankshaft extends, and the first dimension is smaller than the second dimension. In accordance with the fifth aspect, the dimension of the second portion in the direction parallel to the direction in which the crankshaft extends is smaller than the dimension of the second portion in the direction perpendicular to the direction in which the crankshaft extends.

In accordance with a sixth aspect of the present disclosure, the bicycle drive unit according to the fourth or fifth aspect is configured so that a ratio of the second dimension to the first dimension is larger than 1 and smaller than or equal to 1.5. In accordance with the sixth aspect, the second dimension is restricted from becoming larger than 1.5 times the first dimension.

In accordance with a seventh aspect of present disclosure, the bicycle drive unit according to any one of the first to sixth aspects is configured so that the propulsion assist motor has a maximum output torque of larger than or equal to 10 Nm and smaller than or equal to 80 Nm. In accordance with the seventh aspect, the propulsion of the bicycle is assisted in a preferred manner by the propulsion assist motor having the maximum torque of larger than or equal to 10 Nm and smaller than or equal to 80 Nm.

In accordance with an eighth aspect of the present disclosure, the bicycle drive unit according to the seventh aspect is configured so that the maximum output torque of the propulsion assist motor is larger than or equal to 10 Nm and smaller than or equal to 60 Nm. In accordance with the eighth aspect, the propulsion of the bicycle is assisted in a preferred manner by the propulsion assist motor having the maximum torque of larger than or equal to 10 Nm and smaller than or equal to 60 Nm.

In accordance with a ninth aspect of the present disclosure, the bicycle drive unit according to the eighth aspect is configured so that the maximum output torque of the propulsion assist motor is larger than or equal to 10 Nm and smaller than or equal to 40 Nm. In accordance with the ninth aspect, the propulsion of the bicycle is assisted in a preferred manner by the propulsion assist motor having the maximum torque of larger than or equal to 10 Nm and smaller than or equal to 40 Nm.

In accordance with a tenth aspect of the present disclosure, the bicycle drive unit according to any one of the first to ninth aspects is configured so that the propulsion assist motor has a maximum output of larger than or equal to 100 watts and smaller than or equal to 600 watts. In accordance with the tenth aspect, the propulsion of the bicycle is assisted in a preferred manner by the propulsion assist motor having the maximum output of larger than or equal to 100 watts and smaller than or equal to 600 watts.

In accordance with an eleventh aspect of the present disclosure, the bicycle drive unit according to the tenth aspect is configured so that the maximum output of the propulsion assist motor is larger than or equal to 100 watts and smaller than or equal to 450 watts. In accordance with the eleventh aspect, the propulsion of the bicycle is assisted in a preferred manner by the propulsion assist motor having the maximum output of larger than or equal to 100 watts and smaller than or equal to 450 watts.

In accordance with a twelfth aspect of the present disclosure, the bicycle drive unit according to the eleventh aspect is configured so that the maximum output of the propulsion assist motor is larger than or equal to 100 watts and smaller than or equal to 300 watts. In accordance with the twelfth aspect, the propulsion of the bicycle is assisted in a preferred manner by the propulsion assist motor having the maximum output of larger than or equal to 100 watts and smaller than or equal to 300 watts.

In accordance with a thirteenth aspect of the present disclosure, the bicycle drive unit according to any one of the first to twelfth aspects is configured so that the rotational axis of the propulsion assist motor and the rotational axis of the crankshaft are included in the same plane. In accordance with the thirteenth aspect, the bicycle drive unit is further reduced in size than a case where the rotational axis of the propulsion assist motor and the rotational axis of the crankshaft are skew lines.

In accordance with a fourteenth aspect of the present disclosure, the bicycle drive unit according to the thirteenth aspect is configured so that the rotational axis of the propulsion assist motor is orthogonal to the rotational axis of the crankshaft. In accordance with the fourteenth aspect, the bicycle drive unit can be further reduced in size.

In accordance with a fifteenth aspect of the present disclosure, the bicycle drive unit according to any one of the first to fourteenth aspects further includes an output part provided to the housing. The crankshaft and the propulsion assist motor are operatively coupled to the output part to transmit torque from the crankshaft and the propulsion assist motor to the output part. In accordance with the fifteenth aspect, the output part generates the resultant force of the crankshaft and the propulsion assist motor in a preferred manner.

In accordance with a sixteenth aspect of the present disclosure, the bicycle drive unit according to the fifteenth aspect is configured so that the output part is coaxial with the crankshaft and at least partially exposed from the housing. In accordance with the sixteenth aspect, the output part and a member of the power transmission path connected to the output part are easily connected.

In accordance with a seventeenth aspect of the present disclosure, in the bicycle drive unit according to the fifteenth or sixteenth aspect, the output part is configured to mount one or more sprockets. In accordance with the seventeenth aspect, the torque of the crankshaft and the propulsion assist motor is transmitted from the output part to the sprockets.

In accordance with an eighteenth aspect of the present disclosure, the bicycle drive unit according to the seventeenth aspect is configured so that the one or more sprockets each include at least thirty teeth no more than fifty-five teeth. In accordance with the eighteenth aspect, the torque of the crankshaft and the propulsion assist motor is transmitted by the sprockets, each including at least thirty teeth no more than fifty-five teeth.

In accordance with a nineteenth aspect of the present disclosure, the bicycle drive unit according to any one of the fifteenth to eighteenth aspect further includes a first one-way clutch provided to the housing in a first power transmission path between the crankshaft and the output part. In accordance with the nineteenth aspect, the one-way clutch transmits rotation only in one direction of the crankshaft.

In accordance with a twentieth aspect of the present disclosure, the bicycle drive unit according to the nineteenth aspect is configured so that the first one-way clutch is provided to the first portion of the housing. In accordance with the twentieth aspect, the first one-way clutch is located at a position close to the crankshaft.

In accordance with a twenty-first aspect of the present disclosure, the bicycle drive unit according to any one of the fifteenth to twentieth aspects further includes a decelerator provided to the housing and connected to the propulsion assist motor. In accordance with the twenty-first aspect, the decelerator reduces the rotational speed of the propulsion assist motor in a preferred manner.

In accordance with a twenty-second aspect of the present disclosure, the bicycle drive unit according to the twenty-first aspect is configured so that the decelerator includes a first gear, to which the torque of the propulsion assist motor is transmitted, and a second gear engaged with the first gear to transmit the torque to the output. The first gear includes a first rotational axis parallel to the rotational axis of the propulsion assist motor, and the second axis includes a second rotational axis parallel to the rotational axis of the crankshaft. In accordance with the twenty-second aspect of the present disclosure, the first gear and the second gear rotate the output by changing the rotational direction while reducing the rotational speed.

In accordance with a twenty-third aspect of the present disclosure, the bicycle drive unit according to any one of the fifteenth to twenty-second aspect further includes a second one-way clutch provided to a second power transmission path between the propulsion assist motor and the output part. In accordance with the twenty-third aspect, the second one-way clutch restricts the transmission of rotation force to the propulsion assist motor from the crankshaft and the output.

In accordance with a twenty-fourth aspect of the present disclosure, the bicycle drive unit according to the twenty-third aspect is configured so that the second one-way clutch is provided to the first portion of the housing. In accordance with the twenty-fourth aspect, the second one-way clutch is located at a position close to the crankshaft.

In accordance with a twenty-fifth aspect of the present disclosure, the bicycle drive unit according to any one of the first to twenty-fourth aspects further includes an electronic controller provided to the housing and operatively coupled to the propulsion assist motor. In accordance with the twenty-fifth aspect, the wiring between the electronic controller and the propulsion assist motor is shortened.

In accordance with a twenty-sixth aspect of the present disclosure, the bicycle drive unit according to the twenty-fifth aspect further includes a detector provided to the housing and configured to detect human driving force input from the crankshaft. The electronic controller is configured to control the propulsion assist motor in accordance with a detection result of the detector. In accordance with the twenty-sixth aspect, there is no need to mount the detector separately from the bicycle drive unit.

In accordance with a twenty-seventh aspect of the present disclosure, the bicycle drive unit according to any one of the first to twenty-sixth aspects further includes an electrical terminal provided to the housing and electrically connected to a battery that supplies power to the propulsion assist motor. In accordance with the twenty-seventh aspect, the electrical terminal allows the power of the battery to be easily used.

In accordance with a twenty-eighth aspect of the present disclosure, the bicycle drive unit according to the twenty-seventh aspect is configured so that the second portion of the housing includes a first end and a second end in a direction parallel to the rotational axis of the propulsion assist motor, the first end is connected to the first portion, and the electrical terminal is provided on the second end. In accordance with the twenty-eighth aspect, power is easily supplied from the battery located at the end of the second portion opposite to the first portion. In accordance with a twenty-ninth aspect of the present disclosure, the bicycle drive unit according to any one of the first to twenty-eighth aspects is configured so that the second portion has a maximum dimension of smaller than or equal to 60 mm in the direction orthogonal to the rotational axis of the propulsion assist motor. In accordance with the twenty-ninth aspect, the dimension of the second portion in the direction orthogonal to the rotational axis of the propulsion assist motor is set to be smaller than or equal to 60 mm.

The bicycle drive unit in accordance with the present disclosure allows the portion where the propulsion assist motor is provided to be reduced in size in a direction parallel to the rotational axis of the crankshaft.

BRIEF DESCRIPTION OF THE DRAWINGS

Referring now to the attached drawings which form a part of this original disclosure.

FIG. 18 is a right side elevational view showing a fifth step of the method for mounting the bicycle drive unit in accordance with the illustrated embodiment.

FIG. 19 is a right side elevational view showing a sixth step of the method for mounting the bicycle drive unit in accordance with the illustrated embodiment.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

With reference to FIGS. 1 to 19, a bicycle 10 including a bicycle drive unit 60 in accordance with one embodiment will now be described. Hereinafter, the bicycle drive unit 60 will simply be referred to as the drive unit 60. The bicycle 10 is a road bike. However, the present disclosure can also be applied to a bicycle other than a road bike such as a mountain bike or a city bike. The upper and lower directions of the bicycle 10 refer to the upper and lower directions in a state in which the bicycle 10 is ridable and held upright. The sideward direction of the bicycle 10 refers to the left and right directions as viewed in a forward traveling direction of the bicycle 10 from a seated riding position in a state in which the bicycle 10 is ridable and held upright.

Figure 1:
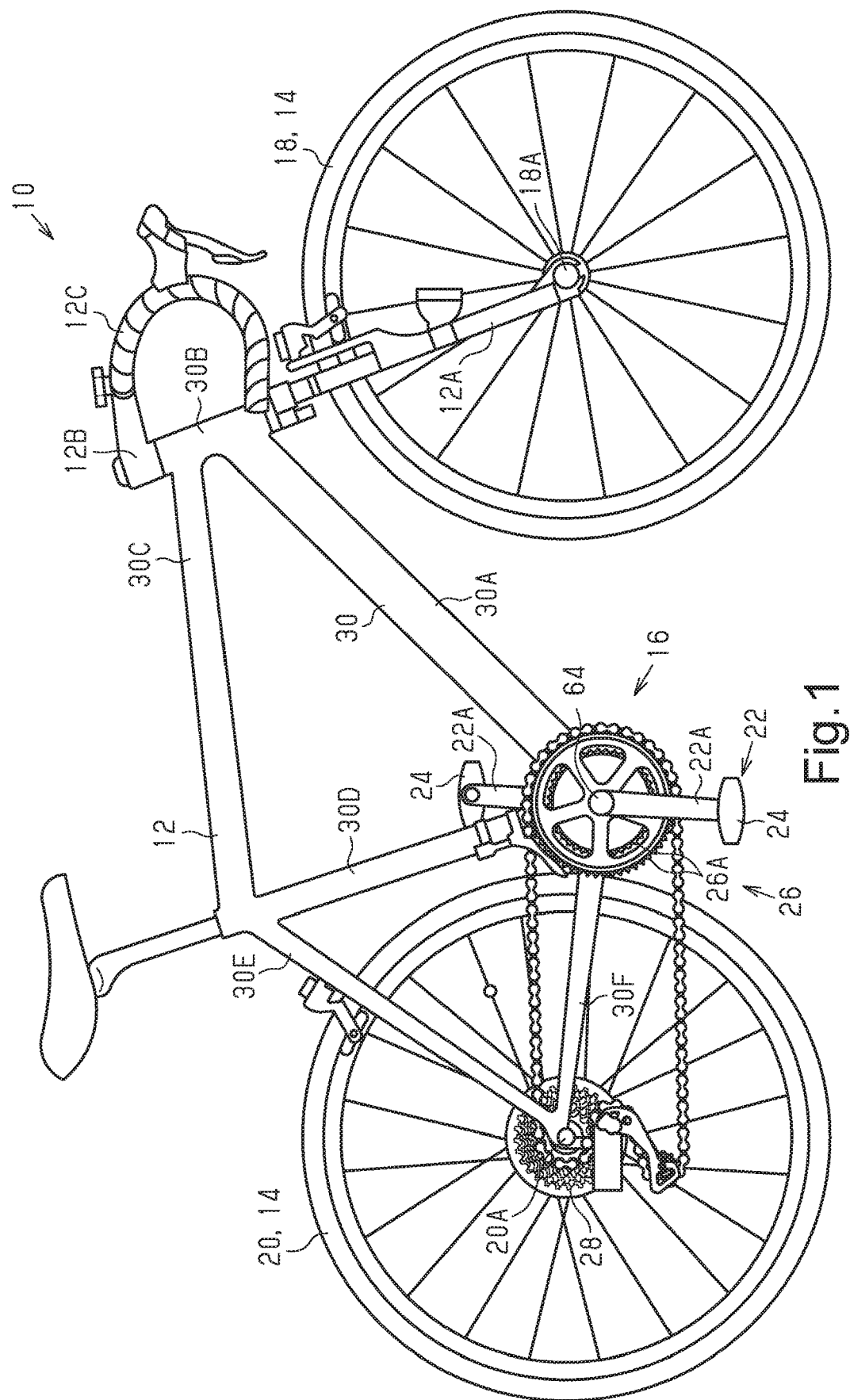
FIG. 1 is a side elevational view of a bicycle including a bicycle drive unit and a bicycle frame in accordance with one embodiment.
Figure 2:
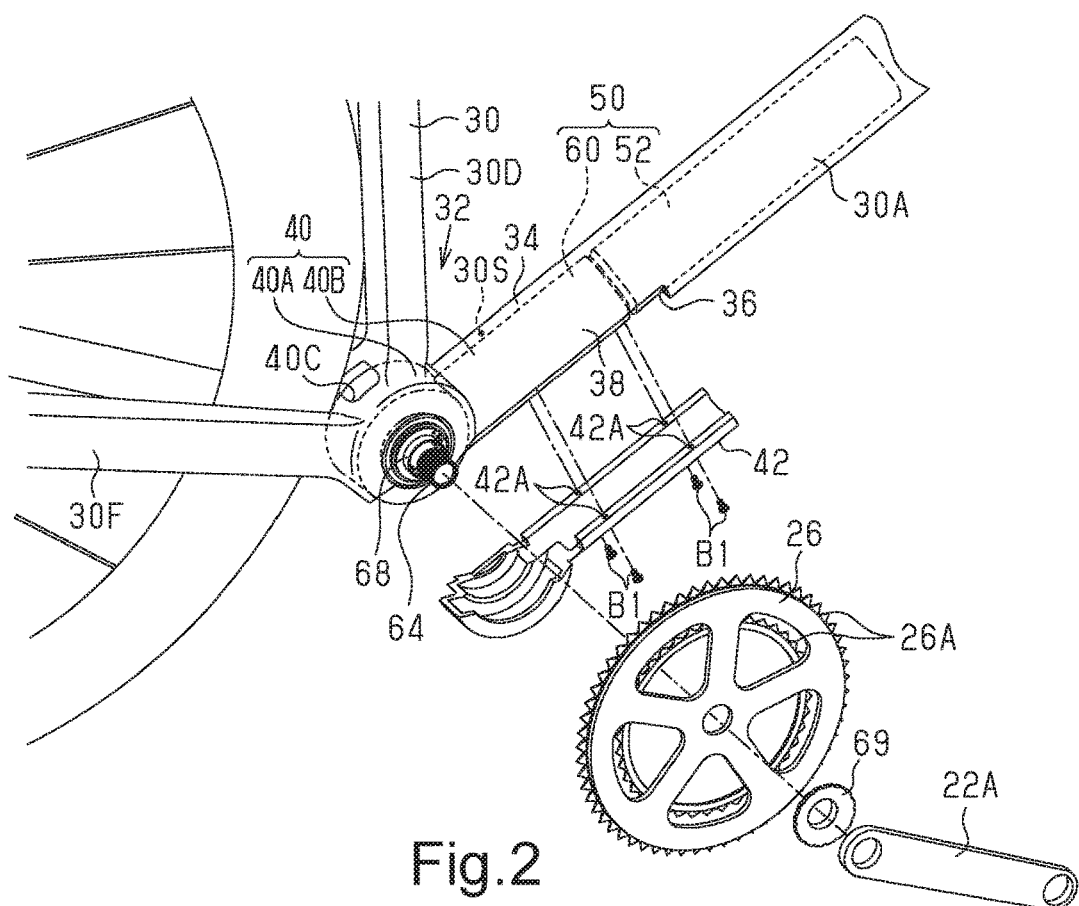
FIG. 2 is a perspective view of a portion of the bicycle illustrated in FIG. 1 in a vicinity of a crankshaft of the bicycle.

As shown in FIGS. 1 and 2, the bicycle 10 includes a bicycle body 12, a pair of wheels 14, a drive mechanism 16 and a bicycle component 50. The bicycle body 12 includes a bicycle frame 30, a front fork 12A and a handlebar 12C. The front fork 12A is connected to the bicycle frame 30. The handlebar 12C is connected in an attachable and detachable manner to the front fork 12A by a stem 12B. Hereinafter, the bicycle frame 30 will simply be referred to as the frame 30. The front fork 12A is supported by the frame 30. The directional terms used to describe the bicycle 10 also apply to the frame 30. In other words, the upper and lower directions of the frame 30 also refer to the upper and lower directions in a state in which the bicycle 10 having the frame 30 is ridable and held upright. The sideward direction of the frame 30 refers to the left and right directions as viewed in a forward traveling direction of the bicycle 10 having the frame 30 from a seated riding position in a state in which the bicycle 10 is ridable and held upright.

The wheels 14 include a front wheel 18 and a rear wheel 20. The front wheel 18 includes an axle 18A connected to an end of the front fork 12A. The rear wheel 20 includes an axle 20A connected to a rear end of the frame 30.

The drive mechanism 16 includes a crank 22 and a pair of pedals 24. The crank 22 includes a crankshaft 64 and a pair of crank arms 22A. The crankshaft 64 is included in the drive unit 60. The drive mechanism 16 transmits the human driving force applied to the pedals 24 to the rear wheel 20. The drive mechanism 16 includes a front rotational body 26 coupled to an output part 68 of the drive unit 60. The front rotational body 26 includes a plurality of sprockets 26A. The drive mechanism 16 is configured to transmit rotation of the crank 22 through, for example, a chain, a belt, or a shaft, to a rear rotational body 28 coupled to the rear wheel 20. The rear rotational body 28 includes a sprocket. A one-way clutch is provided between the rear rotational body 28 and the rear wheel 20. The one-way clutch is configured to rotate the rear wheel 20 forward in case the rear rotational body 28 rotates forward. The rear rotational body 28 can include a plurality of rear sprockets.

The frame 30 includes a mounting portion 32 into which part of a housing 62 of the drive unit 60 is inserted (refer to FIG. 2). The frame 30 includes a down tube 30A. The frame 30 further includes a head tube 30B, a top tube 30C, a seat tube 30D, a seat stay 30E and a chainstay 30F.

Figure 3:
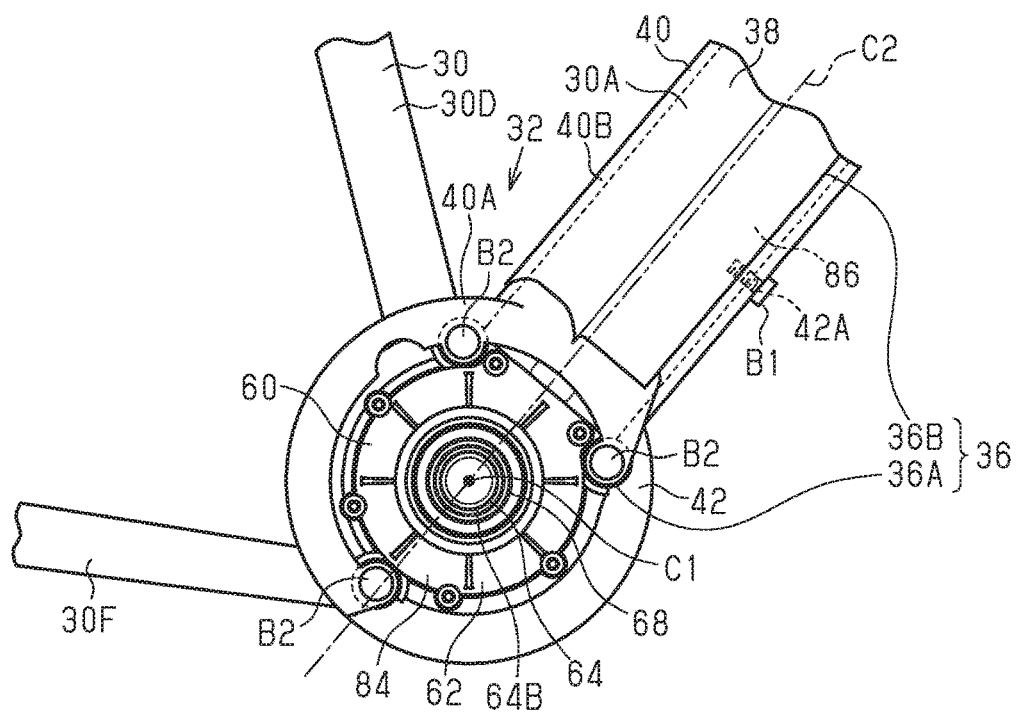
FIG. 3 is a right side elevational view of the portion of the bicycle illustrated in FIG. 2 in the vicinity of the crankshaft of the bicycle.
Figure 4:
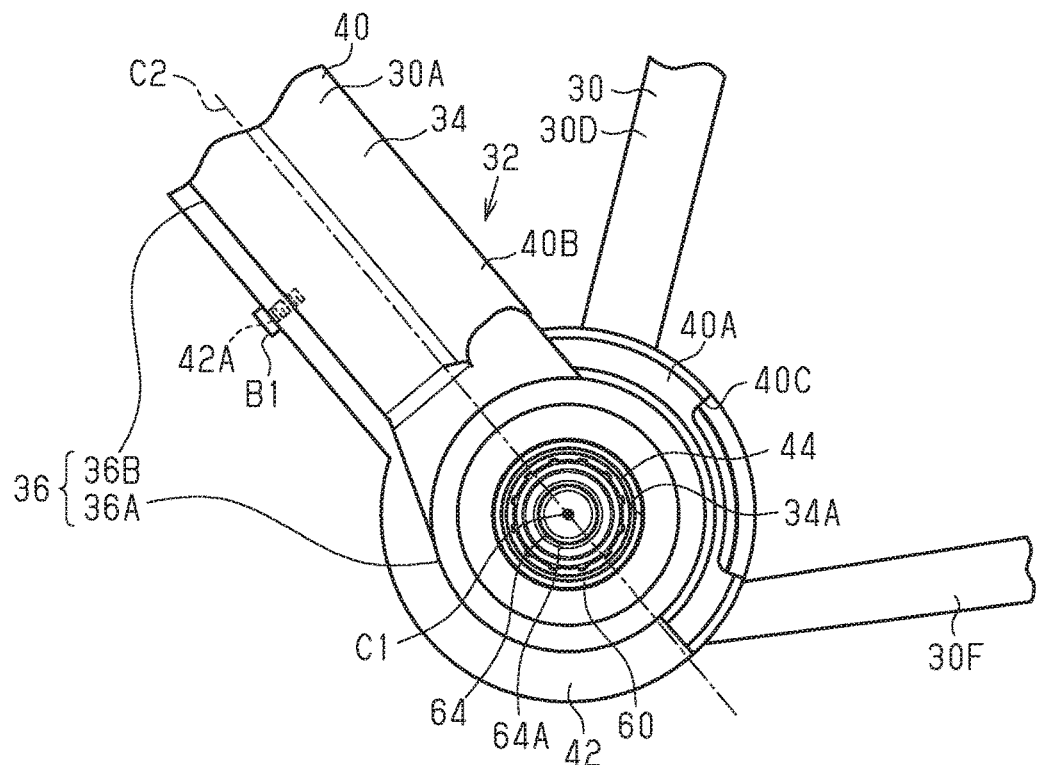
FIG. 4 is a left side elevational view of the portion of the bicycle illustrated in FIG. 2 in the vicinity of the crankshaft of the bicycle.

As shown in FIG. 2, the mounting portion 32 is at least partially provided on the down tube 30A. The mounting portion 32 includes a first side wall 34 and an opening 36. As shown in FIG. 3, the mounting portion 32 further includes a second side wall 38 and a joint 40. As shown in FIG. 4, the frame 30 includes a through hole 34A through which a first end 64A of the crankshaft 64 in an axial direction extends. The first end 64A of the crankshaft 64 includes a serrated outer circumferential portion. One of the crank arms 22A is coupled in an attachable and detachable manner to the first end 64A of the crankshaft 64.

Figure 5:
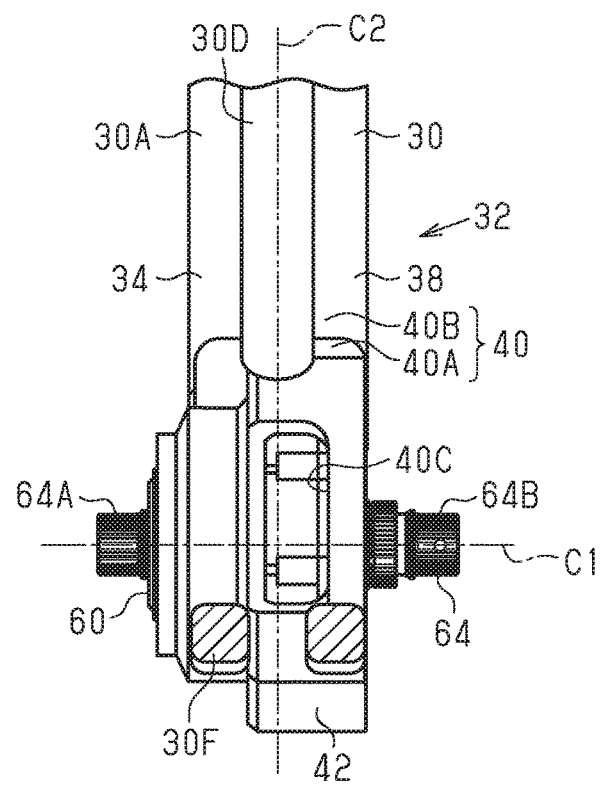
FIG. 5 is a rear side elevational view of the portion of the bicycle illustrated in FIG. 2 in the vicinity of the crankshaft of the bicycle.

As shown in FIGS. 2, 4 and 5, the first side wall 34 extends in a direction intersecting the sideward direction of the bicycle 10. Preferably, the first side wall 34 extends in a direction orthogonal to the sideward direction of the bicycle 10. The first side wall 34 includes the through hole 34A through which the crankshaft 64 extends. The mounting portion 32 includes an accommodation compartment 30S and an opening 36. The accommodation compartment 30S accommodates the bicycle component 50. In particular, the accommodation compartment 30S at least partially accommodates a part of the bicycle component 50

As shown in FIGS. 2, 3, and 5, the second side wall 38 extends in a direction intersecting the sideward direction of the bicycle 10. Preferably, the second side wall 38 extends in a direction orthogonal to the sideward direction of the bicycle 10. The second side wall 38 is spaced apart from the first side wall 34 in the sideward direction of the bicycle 10.

As shown in FIGS. 2, 4 and 5, the joint 40 joins the first side wall 34 and the second side wall 38. The joint 40 joins the upper ends of the first side wall 34 and the second side wall 38. The joint 40 includes an arcuate first joint portion 40A. The joint 40 further includes a second joint portion 40B joined with the front end of the first joint portion 40A. The second joint portion 40B is included in the down tube 30A.

The seat tube 30D and the chainstay 30F are joined with the joint 40. The first joint portion 40A extends in the circumferential direction about the rotational axis C1 of the crankshaft 64. Preferably, the first joint portion 40A of the joint 40 is formed integrally with the seat tube 30D and the chainstay 30F as a one-piece member but can be joined with the seat tube 30D and the chainstay 30F through welding, bonding, or the like. The second joint portion 40B can be formed as part of the down tube 30A as a one-piece member, or can be joined with the rest of the down tube 30A through welding, bonding, or the like. The joint 40 includes a hole 40C that allows for insertion of an electric cable. The hole 40C is located between the seat tube 30D and the chainstay 30F. The hole 40C extends through the joint 40. The second side wall 38 includes the arcuate portion joined with the first joint portion 40A.

Figure 11:
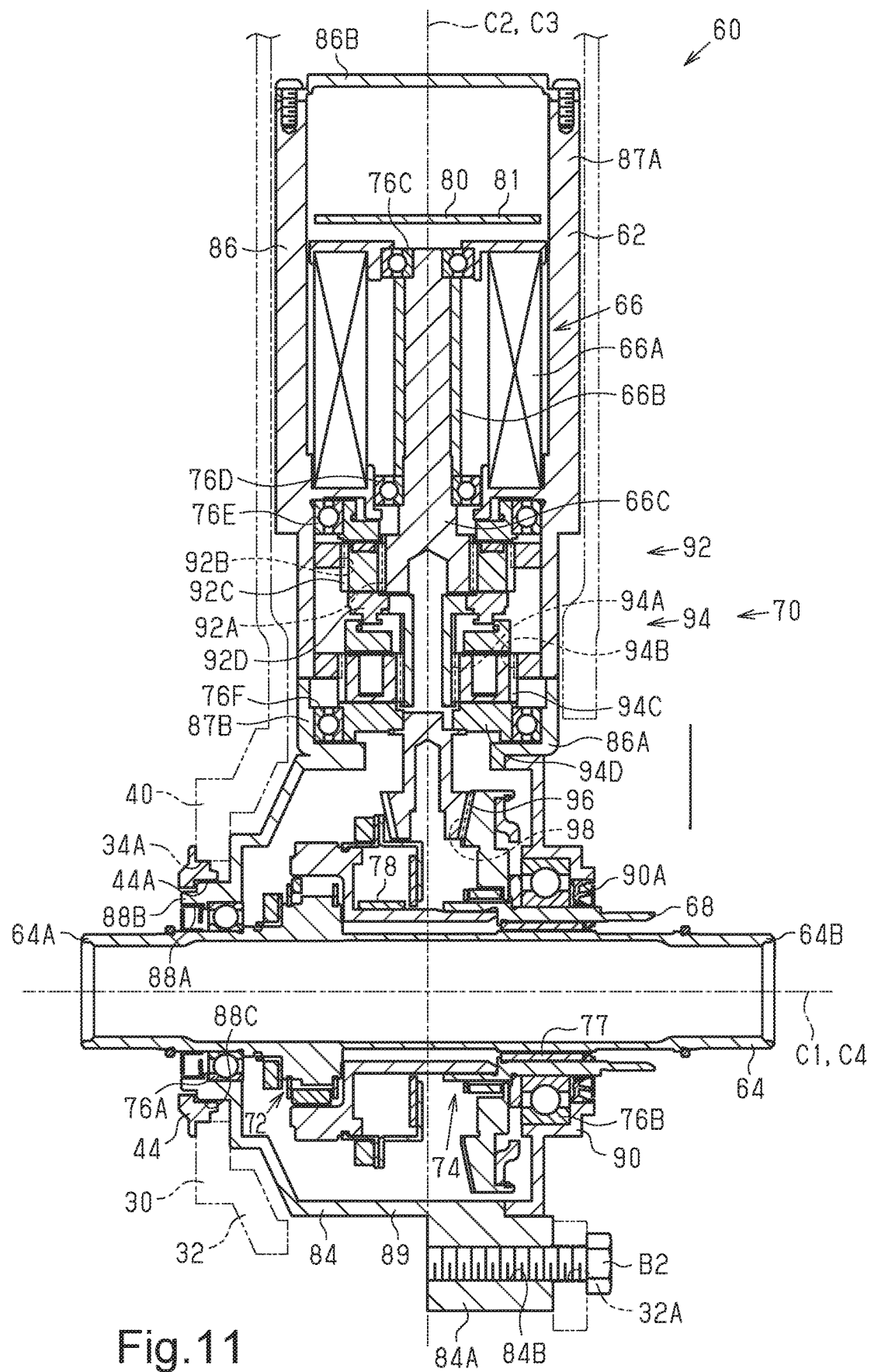
FIG. 11 is a cross-sectional view of the bicycle drive unit taken along line XI-XI in FIG. 8.

The opening 36 shown in FIGS. 2 to 4 opens in a direction intersecting a rotational axis C2 of a propulsion assist motor 66 of the drive unit 60 (refer to FIG. 11). Hereinafter, the propulsion assist motor 66 will simply be referred to as the motor 66. The opening 36 includes a first opening portion 36A and a second opening portion 36B. The second opening portion 36B is connected to the first opening portion 36A. The first opening portion 36A opens toward the lower side of the bicycle 10 and at least one side in the sideward direction of the bicycle 10. The first opening portion 36A can open in only the lower side of the bicycle 10, only the sideward direction of the bicycle 10, or both the lower side of the bicycle 10 and the sideward direction of the bicycle 10. In the present embodiment, the first opening portion 36A opens toward the lower side of the bicycle 10, and opens toward one side in the sideward direction of the bicycle 10. The second opening portion 36B extends in the longitudinal direction of the frame 30. At least part of the second opening portion 36B is defined by the down tube 30A, and opens toward the lower side of the bicycle 10. The opening 36 is located in the lower end of the down tube 30A.

The first opening portion 36A is formed to allow for insertion of at least part of a first portion 84 of the housing 62 accommodating the crankshaft 64. The second opening portion 36B is formed to allow for insertion of at least part of a second portion 86 of the housing 62 accommodating the motor 66. The frame 30 includes the accommodation compartment 30S (refer to FIG. 2) that allows for accommodation of the second portion 86.

The frame 30 further includes a cover 42. The cover 42 closes at least part of the opening 36. Preferably, the cover 42 entirely closes the second opening portion 36B and a part of the first opening portion 36A that opens toward the lower side of the bicycle 10. The cover 42 includes two frame attaching portions 42A that are attachable to at least one of the opening 36 and the drive unit 60. The frame attaching portions 42A can be attachable to only the mounting portion 32 of the frame 30 adjacent the opening 36, only the drive unit 60, or both the mounting portion 32 and the drive unit 60. Here, the cover 42 is attached to the mounting portion 32 by a plurality of bolts B1 coupling the frame attaching portions 42A to the first and second side walls 34 and 38. The frame attaching portions 42A include a pair of holes into which the bolts B1 are inserted. The bolts B1 are inserted through the holes of the frame attaching portions 42A and fastened to threaded holes provided to the first and second side walls 34 and 38 of the mounting portion 32 around the opening 36 to attach the cover 42 to the mounting portion 32.

As shown in FIG. 2, the bicycle component 50 includes the drive unit 60 and a battery 52. The bicycle component 50 does not have to include the battery 52. The drive unit 60 and the battery 52 are accommodated in the frame 30 in a state connected to each other. The drive unit 60 and the battery 52 can be physically and electrically connected. Alternatively, the housing 62 and the battery 52 can be spaced apart from each other and electrically connected by an electrical cable.

Figure 6:
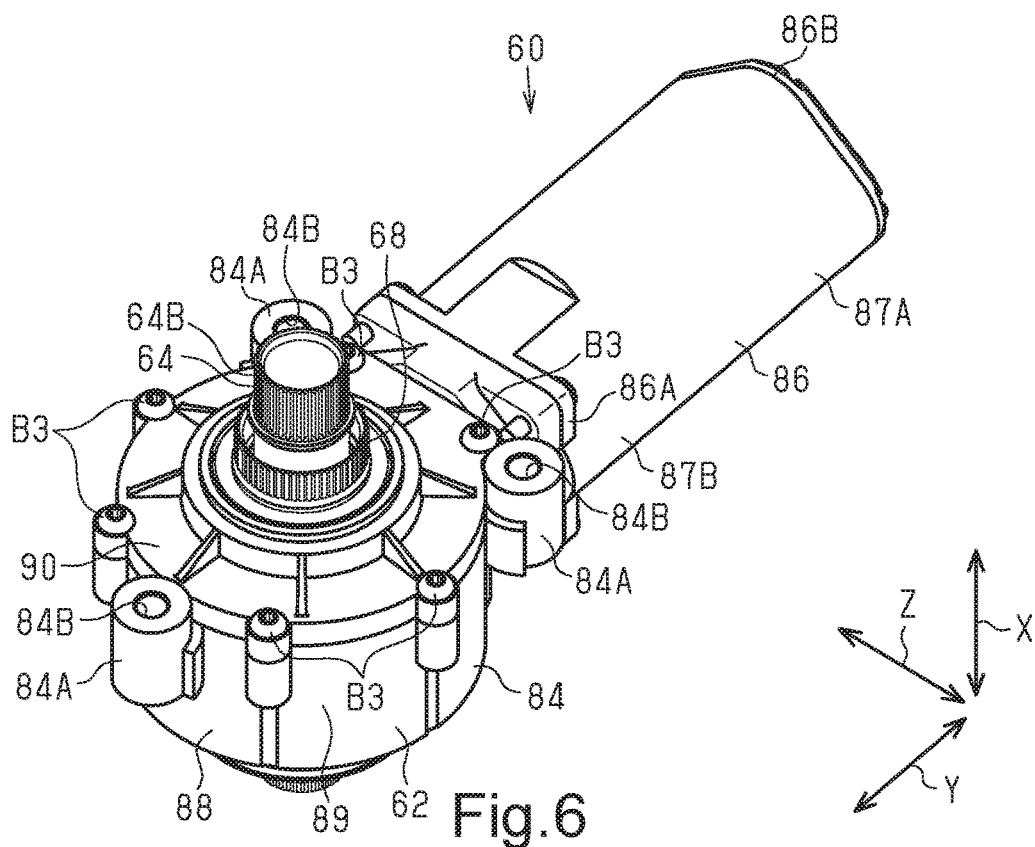
FIG. 6 is a first perspective view of the bicycle drive unit of the bicycle illustrated in FIG. 2.
Figure 7:
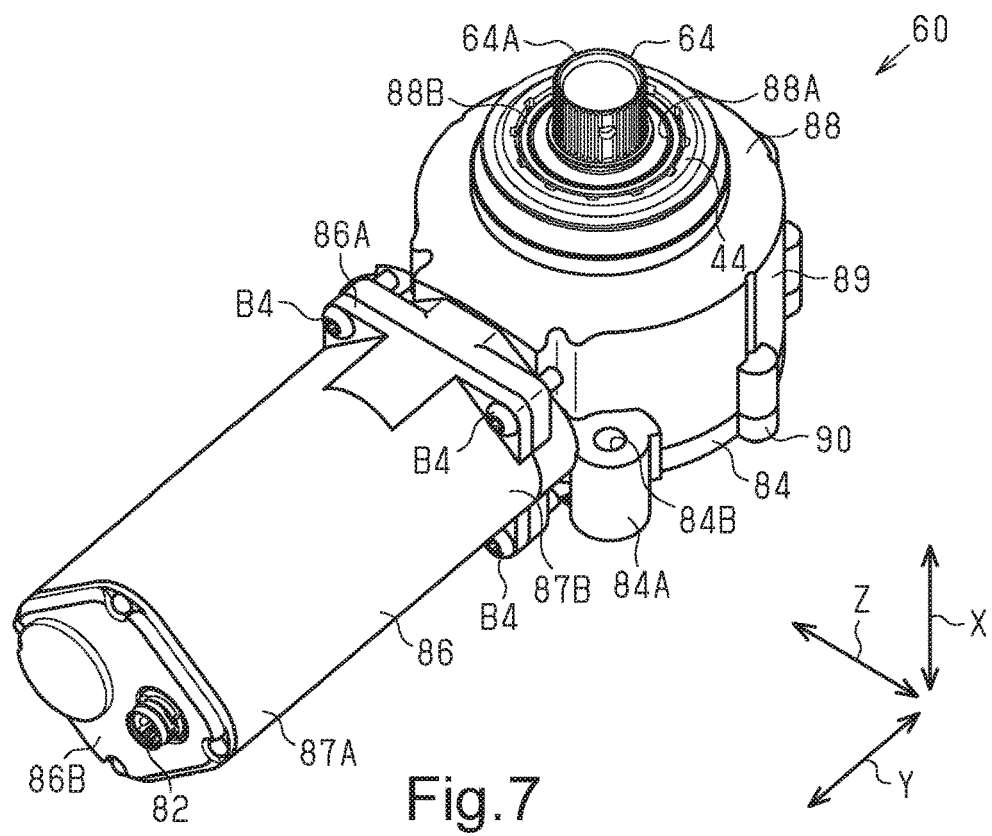
FIG. 7 is a second perspective view of the bicycle drive unit of the bicycle illustrated in FIG. 6.

As shown in FIGS. 6, 7, and 11, the drive unit 60 includes the housing 62, the crankshaft 64 and the motor 66. Preferably, the drive unit 60 further includes the output part 68, a decelerator 70, a first one-way clutch 72, a second one-way clutch 74, a plurality of bearings 76A to 76F, a detector 78, an electronic controller 80 and an electrical terminal 82.

The drive unit 60 includes a first direction X, a second direction Y and a third direction Z. The first direction X is parallel to the direction in which the crankshaft 64 extends. The direction in which the crankshaft 64 extends is parallel to the rotational axis C1 of the crankshaft 64. The second direction Y is parallel to the rotational axis C2 of the motor 66. The second direction Y intersects the first direction X. Preferably, the first direction X and the second direction Y extend perpendicular to each other on a plane orthogonal to the rotational axis C2 of the motor 66. The third direction Z is orthogonal to the first direction X and the second direction Y.

Figure 8:
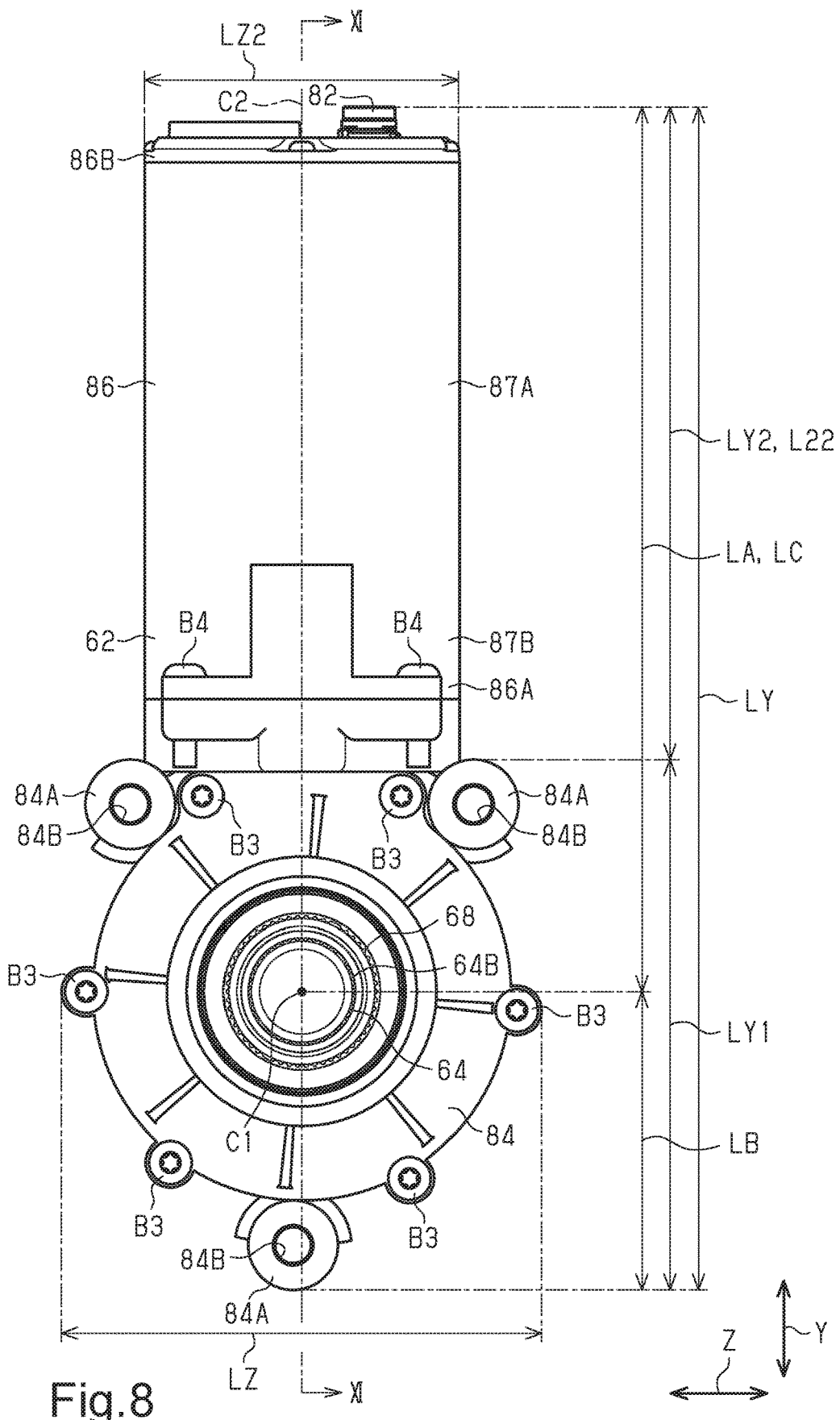
FIG. 8 is a side view of the bicycle drive unit illustrated in FIGS. 6 and 7.
Figure 9:
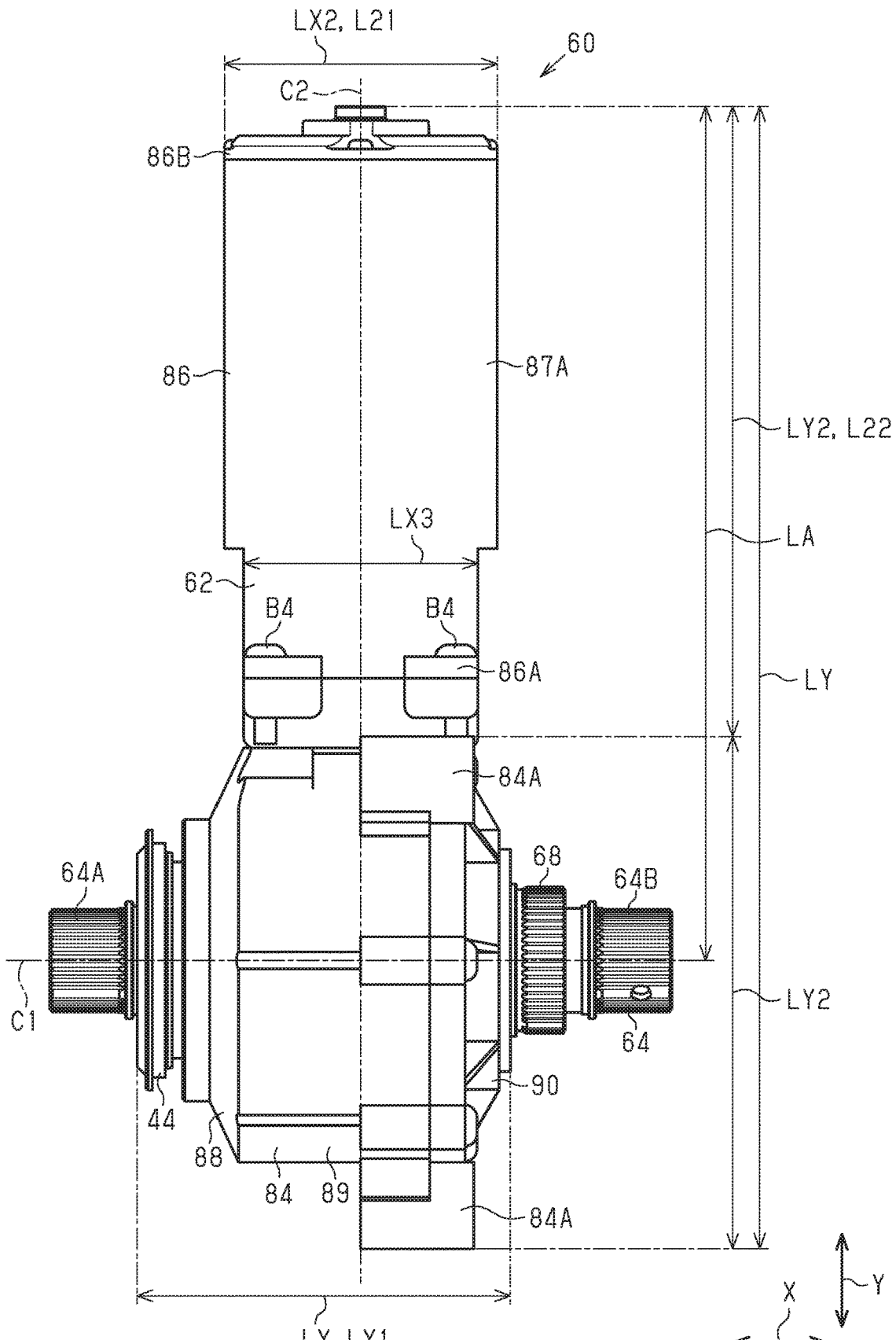
FIG. 9 is a rear view of the bicycle drive unit illustrated in FIGS. 6 to 8.
Figure 10:
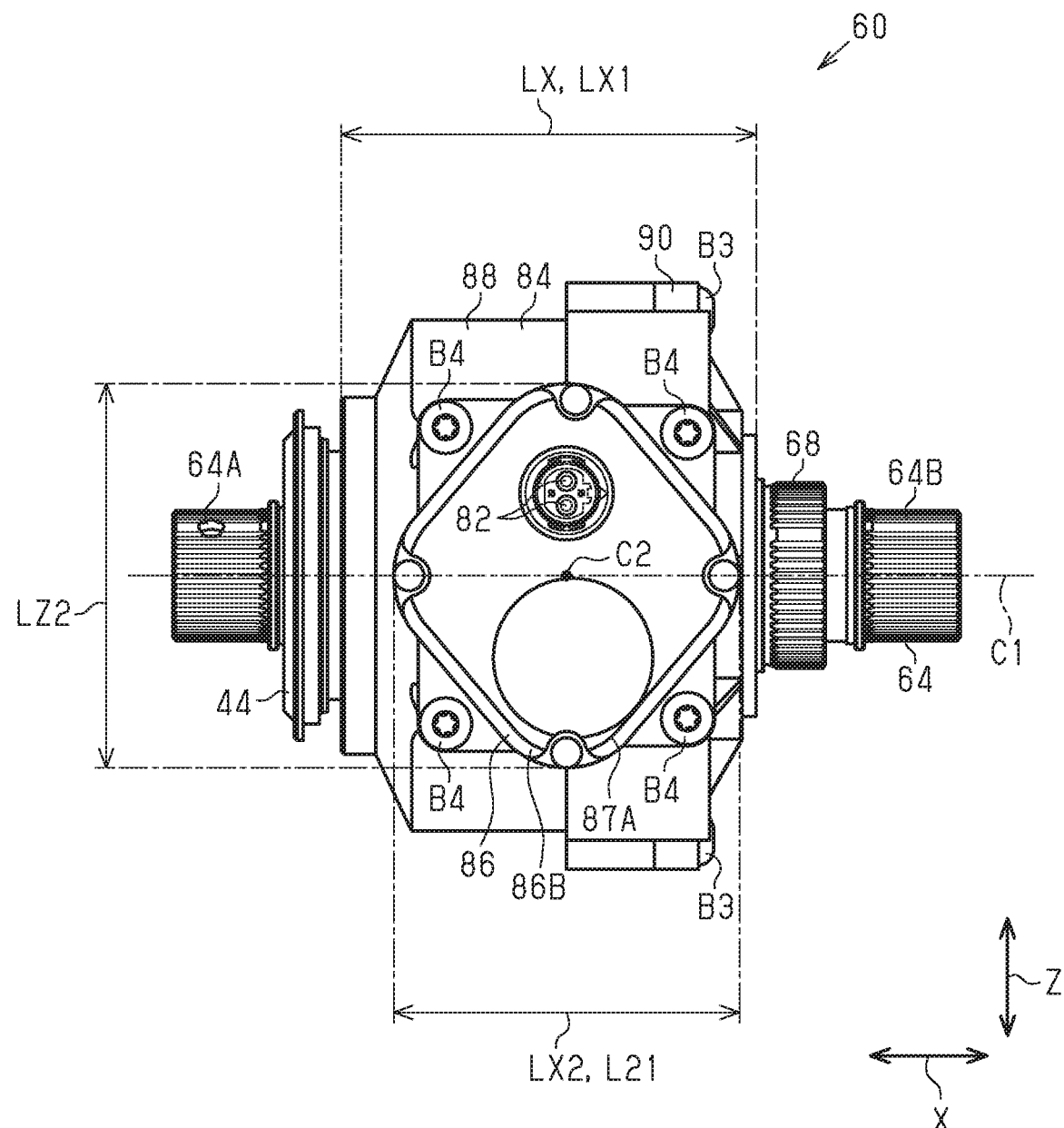
FIG. 10 is a plan view of the bicycle drive unit illustrated in FIGS. 6 to 9.

With reference to FIGS. 8 to 10, the dimensions of the drive unit 60 will now be described. In a direction parallel to the rotational axis C2 of the motor 66, the drive unit 60 has a maximum dimension LY that is preferably smaller than or equal to 300 mm. More preferably, in the direction parallel to the rotational axis C2 of the motor 66, the maximum dimension LY of the drive unit 60 is smaller than or equal to 270 mm. Further, preferably, in the direction parallel to the rotational axis C2 of the motor 66, the maximum dimension LY of the drive unit 60 is smaller than or equal to 150 mm. The maximum dimension LY of the drive unit 60 in the direction parallel to the rotational axis C2 of the motor 66 is substantially equal to the maximum dimension of the housing 62 in the direction parallel to the rotational axis C2 of the motor 66.

In the direction parallel to the rotational axis C2 of the motor 66, a distance LA from the rotational axis C1 of the crankshaft 64 to the part of the drive unit 60 that is the farthest from the rotational axis C1 of the crankshaft 64 is preferably smaller than or equal to 210 mm. More preferably, the distance LA from the rotational axis C1 of the crankshaft 64 to the part of the drive unit 60 that is the farthest from the rotational axis C1 of the crankshaft 64 is smaller than or equal to 190 mm. Preferably, the distance LA from the rotational axis C1 of the crankshaft 64 to the part of the drive unit 60 that is the farthest from the rotational axis C1 of the crankshaft 64 is larger than or equal to 100 mm.

In a direction orthogonal to the rotational axis C2 of the motor 66 and the rotational axis C1 of the crankshaft 64, the drive unit 60 has a maximum dimension LZ of, preferably, smaller than or equal to 110 mm. More preferably, in the direction orthogonal to the rotational axis C2 of the motor 66 and the rotational axis C1 of the crankshaft 64, the maximum dimension LZ of the drive unit 60 is smaller than or equal to 80 mm. Preferably, the maximum dimension LZ of the drive unit 60 in the direction orthogonal to the rotational axis C2 of the motor 66 and the rotational axis C1 of the crankshaft 64 is larger than or equal to 50 mm. The maximum dimension LZ of the drive unit 60 in the direction orthogonal to the rotational axis C2 of the motor 66 and the rotational axis C1 of the crankshaft 64 is substantially equal to the maximum dimension of the housing 62 in the direction orthogonal to the rotational axis C2 of the motor 66 and the rotational axis C1 of the crankshaft 64.

Preferably, the ratio of the maximum dimension LZ of the drive unit 60 in the direction orthogonal to the rotational axis C2 of the motor 66 and the rotational axis C1 of the crankshaft 64 to the maximum dimension LY of the drive unit 60 in the direction parallel to the rotational axis C2 of the motor 66 is smaller than or equal to 6. More preferably, the ratio of the maximum dimension LZ of the drive unit 60 in the direction orthogonal to the rotational axis C2 of the motor 66 and the rotational axis C1 of the crankshaft 64 to the maximum dimension LY is larger than or equal to 1.3 and less than or equal to 6. Further preferably, the ratio of the maximum dimension LZ of the drive unit 60 in the direction orthogonal to the rotational axis C2 of the motor 66 and the rotational axis C1 of the crankshaft 64 to the maximum dimension LY is smaller than or equal to 4.

In a direction parallel to the rotational axis C1 of the crankshaft 64, the housing 62 has a maximum dimension LX that is preferably smaller than or equal to 100 mm. More preferably, the maximum dimension LX of the housing 62 in the direction parallel to the rotational axis C1 of the crankshaft 64 is smaller than or equal to 80 mm. Preferably, the maximum dimension LX of the housing 62 in the direction parallel to the rotational axis C1 of the crankshaft 64 is larger than or equal to 70 mm.

As shown in FIGS. 7 and 11, the housing 62 accommodates a part of the crankshaft 64, the motor 66, a part of the output part 68, the decelerator 70, the first one-way clutch 72, the second one-way clutch 74, the bearings 76A to 76F, the detector 78, the electronic controller 80 and a part of the electrical terminal 82.

As shown in FIG. 3, the housing 62 is configured to be mounted on the frame 30 of the bicycle 10. The housing 62 includes first coupling portions 84B that are coupled to the frame 30. The housing 62 is configured so as to be at least partially accommodated in the frame 30. As shown in FIGS. 6 to 11, the housing 62 includes the first portion 84 and the second portion 86.

The first portion 84 has an outer shape that is substantially cylindrical. The first portion 84 includes an outer circumferential portion provided with one or more projections 84A projecting radially outward from the first portion 84. Preferably, there is a plurality of, for example, three projections 84A. Each of the projections 84A includes one of the first coupling portions 84B, which is coupled to the frame 30. The first coupling portion 84B includes a threaded hole fastened with a bolt B2 (refer to FIG. 11) used to mount the drive unit 60 on the frame 30. Preferably, the rotational axis C1 of the crankshaft 64 is arranged in an area surrounded by line segments connecting the threaded hole center of each first coupling portions 84B as viewed in the axial direction of the crankshaft 64.

The frame 30 includes second coupling portions 32A that are coupled to the first coupling portions 84B. The second coupling portions 32A include a plurality of holes for insertion of the bolts B2. The holes of the second coupling portions 32A extend parallel to the crankshaft 64. The second coupling portions 32A are provided adjacent the opening 36. The first portion 84 includes a first side surface 88 and a second side surface 90. The first side surface 88 includes one of the end faces in the sideward direction of the bicycle 10. The second side surface 90 includes the other one of the end faces in the sideward direction of the bicycle 10. The first side surface 88 and the second side surface 90 are connected by a connecting wall 89. Preferably, the connecting wall 89 is formed integrally with the first side surface 88 as a one-piece member. The connecting wall 89 extends around the rotational axis C1 of the crankshaft 64. The connecting wall 89 connects the outer circumference of the first side surface 88 and the outer circumference of the second side surface 90 with respect to the radial direction of the crankshaft 64. The second side surface 90 is coupled by a plurality of bolts B3 to the connecting wall 89. The bolts B3 are inserted through insertion holes formed in the outer circumferential portion of the second side surface 90 with respect to the radial direction of the crankshaft 64 and fastened to threaded holes provided to the connecting wall 89.

The first side surface 88 includes a first hole 88A through which the first end 64A of the crankshaft 64 passes. The first side surface 88 includes a ring 88B that projects outward in the sideward direction of the bicycle 10. The ring 88B includes the first hole 88A. The ring 88B includes an outer circumferential portion defining a third coupling portion 88C. A coupling member 44 is coupled to the third coupling portion 88C to couple the drive unit 60 to the frame 30. The third coupling portion 88C includes a male thread. The coupling member 44 is annular and includes an inner circumferential portion forming a female thread 44A. The female thread 44A of the coupling member 44 is configured to be joined with the male thread of the third coupling portion 88C. The third coupling portion 88C is spaced apart from the first coupling portions 84B in the axial direction of the crankshaft 64. The second side surface 90 includes a second hole 90A through which a second end 64B of the crankshaft 64 and the output part 68 extends. The second end 64B of the crankshaft 64 has a serrated outer circumferential portion. One of the crank arms 22A is coupled in an attachable and detachable manner to the second end 64B of the crankshaft 64.

The second portion 86 extends along the rotational axis C2 of the motor 66. The second portion 86 includes a first end 86A and a second end 86B that are spaced in the direction parallel to the rotational axis C2 of the motor 66. The first end 86A is connected to the first portion 84. A tubular retainer 87A extends between the first end 86A and the second end 86B.

The second portion 86 includes the retainer 87A and a connecting section 87B connected to the first portion 84. The connecting section 87B is provided at the first end 86A. The connecting section 87B is formed integrally with the retainer 87A as a one-piece member. The connecting section 87B is connected by a plurality of bolts B4 to the first portion 84. The first portion 84 and the second portion 86 are preferably coupled in a detachable manner but can be coupled in a non-detachable manner.

The first portion 84 has a maximum dimension LX1 in a direction in which the crankshaft 64 extends that is, preferably, smaller than or equal to 100 mm. More preferably, the maximum dimension LX1 of the first portion 84 in the direction in which the crankshaft 64 extends is smaller than or equal to 80 mm. Further preferably, the maximum dimension LX1 of the first portion 84 in the direction in which the crankshaft 64 extends is larger than or equal to 70 mm and smaller than or equal to 100 mm.

A maximum dimension LY1 of the first portion 84 in a direction parallel to the rotational axis C2 of the motor 66 is smaller than a maximum dimension LY2 of the second portion 86 in the direction parallel to the rotational axis C2 of the motor 66. In the direction parallel to the rotational axis C2 of the motor 66, a distance LB from the rotational axis C1 of the crankshaft 64 to the part of the first portion 84 that is farthest from the rotational axis C1 of the crankshaft 64 is shorter than a distance LC from the rotational axis C1 of the crankshaft 64 to the part of the second portion 86 that is farthest from the rotational axis C1 of the crankshaft 64. In the direction parallel to the rotational axis C2 of the motor 66, the distance LC is substantially equal to the distance LA from the rotational axis C1 of the crankshaft 64 to the part of the drive unit 60 that is the farthest from the rotational axis C1 of the crankshaft 64.

The maximum dimension LX1 of the first portion 84 in the direction parallel to the rotational axis C1 of the crankshaft 64 is larger than the maximum dimension of the second portion 86 in the direction parallel to the rotational axis C1 of the crankshaft 64.

The maximum dimension of the second portion 86 in a direction orthogonal to the rotational axis C2 of the motor 66 is preferably equal to a maximum dimension LZ2 of the second portion 86 in a direction orthogonal to the rotational axis C2 of the motor 66 and parallel to the rotational axis C1 of the crankshaft 64. Preferably, the maximum dimension LZ2 of the second portion 86 in the direction orthogonal to the rotational axis C2 of the motor 66 is smaller than or equal to 75 mm. More preferably, the maximum dimension LZ2 of the second portion 86 in the direction orthogonal to the rotational axis C2 of the motor 66 is smaller than or equal to 60 mm. Preferably, the maximum dimension LZ2 of the second portion 86 in the direction orthogonal to the rotational axis C2 of the motor 66 is larger than or equal to 50 mm.

In a direction orthogonal to the rotational axis C2 of the motor 66, the second portion 86 has a minimum dimension LX3 that is, preferably, larger than or equal to 40 mm. Preferably, the minimum dimension LX3 of the second portion 86 is smaller than or equal to 75 mm.

Preferably, the minimum dimension of the retainer 87A in a direction orthogonal to the rotational axis C2 of the motor 66 is substantially equal to a minimum dimension LX2 of the retainer 87A in a direction orthogonal to the rotational axis C2 of the motor 66 and parallel to the rotational axis C1 of the crankshaft 64. The minimum dimension LX2 of the retainer 87A in the direction orthogonal to the rotational axis C2 of the motor 66 is, preferably, larger than or equal to 40 mm. Preferably, the minimum dimension LX2 of the motor retainer 87A is smaller than or equal to 75 mm.

The second portion 86 is configured so that a first dimension L21 in the first direction X differs from a second dimension L22 in the second direction Y. The first dimension L21 is smaller than the second dimension L22. The ratio of the second dimension L22 to the first dimension L21 is larger than 1 and smaller than or equal to 1.5.

The electrical terminal 82 is provided on the housing 62. The electrical terminal 82 is provided on the second end 86B of the second portion 86. The electrical terminal 82 is electrically connected to the battery 52. The electrical terminal 82 is provided on the end of the housing 62 including the part of the drive unit 60 that is farthest from the rotational axis C1 of the crankshaft 64. The part of the drive unit 60 that is farthest from the rotational axis C1 of the crankshaft 64 includes the second end 86B.

The crankshaft 64 is provided to the housing 62. The crankshaft 64 is provided to the first portion 84. The output part 68 is provided to the housing 62. Torque is transmitted from the crankshaft 64 and the motor 66 to the output part 68. The output part 68 is provided to the first portion 84. The output part 68 is coaxial with the crankshaft 64. More specifically, here, the output part 68 is a hollow output shaft that is coaxially disposed around the crankshaft 64. At least part of the output part 68 is exposed from the housing 62.

The output part 68 is configured to allow for the mounting of one or more sprockets 26A (refer to FIG. 2). The one or more sprockets 26A each include teeth, the number of which is larger than or equal to 30 and smaller than or equal to 55. The output part 68 is provided on the outer circumference of the crankshaft 64. The second end 64B of the crankshaft 64 passes through the output part 68. The output part 68 has a substantially tubular shape. The output part 68 has a serrated outer circumferential portion. The sprockets 26A are coupled to the output part 68 in an attachable and detachable manner. The output part 68 is configured to allow for coupling of a coupling member 69 used to couple the sprockets 26A to the output part 68 (refer to FIG. 2). The output part 68 includes an inner circumferential portion forming a female thread. The coupling member 69 is annular. The coupling member 69 includes a male thread configured to be joined with the female thread of the output part 68. Instead, the output part 68 can include an outer circumferential portion forming a male thread, and the coupling member 69 can include a female thread. This also allows the coupling member 69 and the output part 68 to be joined.

The first bearing 76A is provided on a surface defining the first hole 88A in the first side surface 88 of the first portion 84. The first bearing 76A supports the crankshaft 64 so that the crankshaft 64 is rotatable relative to the housing 62. The second bearing 76B is provided on a surface defining the second hole 90A in the second side surface 90 of the first portion 84. The second bearing 76B supports the output part 68 so that the output part 68 is rotatable relative to the housing 62. A support 77 is located between the crankshaft 64 and the output part 68. The support 77 supports the crankshaft 64 so that the crankshaft 64 is rotatable relative to the output part 68. The support 77 can include a bearing or a sleeve. The sleeve can be formed from metal or resin.

The first one-way clutch 72 is provided to the housing 62. The one-way clutch 72 is provided to the first portion 84 of the housing 62. The first one-way clutch 72 is provided to a first power transmission path between the crankshaft 64 and the output part 68. The first one-way clutch 72 is located between the outer circumference of the crankshaft 64 and the inner circumference of the output part 68. The output part 68 can be configured by a single member or a plurality of members. The first one-way clutch 72 transmits the rotation of the crankshaft 64 to the output part 68 in case the crankshaft 64 is rotated in a first rotation direction to move the bicycle 10 forward. The first one-way clutch 72 does not transmit the rotation of the crankshaft 64 to the output part 68 in case the crankshaft 64 is rotated in a second direction that is opposite to the first rotation direction. The first one-way clutch 72 can be configured by a roller clutch or a ratchet clutch. The first one-way clutch 72 includes an inner race that can be formed integrally with the crankshaft 64 as a one-piece member. Further, the first one-way clutch 72 includes an outer race that can be formed integrally with the output part 68 as a one-piece member. The first one-way clutch 72 can be omitted. In this case, the crankshaft 64 and the output part 68 are fixed together so as to be non-rotatable relative to each other and so as to be rotated integrally with each other.

The motor 66 is provided to the housing 62 to assist propulsion of the bicycle 10. In particular, the motor 66 is configured to add an assisting force to a human drive force inputted from the crankshaft 64. The motor 66 is provided to the second portion 86. The motor 66 includes an electric motor. The motor 66 is the so-called brushless motor. The motor 66 includes a stator 66A, a rotor 66B, and an output shaft 66C. The stator 66A is fixed to the inner circumference of the second portion 86. The rotor 66B is arranged in the inner circumferential portion of the stator 66A. The rotor 66B and the output shaft 66C are supported by the third bearing 76C and fourth bearing 76D, which are provided to the second portion 86, to be rotatable relative to the second portion 86.

The motor 66 includes the rotational axis C2 that extends in a direction intersecting the direction in which the crankshaft 64 extends. In one example, the rotational axis C2 of the motor 66 and the rotational axis C1 of the crankshaft 64 are included in the same plane. In one example, the rotational axis C2 of the motor 66 is orthogonal to the rotational axis C1 of the crankshaft 64.

The decelerator 70 is provided to the housing 62. At least part of the decelerator 70 is provided to at least one of the first portion 84 and the second portion 86. The decelerator 70 is connected to the motor 66. The decelerator 70 includes a first reduction mechanism 92, a second reduction mechanism 94, a first gear 96, and a second gear 98. The decelerator 70 reduces the speed of the rotation generated by the motor 66 and transmits the rotation to the output part 68.

The first reduction mechanism 92 includes a planetary gear mechanism. The first reduction mechanism 92 includes a first sun gear 92A, a first ring gear 92B, a plurality of first planet gears 92C, and a first carrier 92D. The first sun gear 92A is provided on the outer circumference of the output shaft 66C of the motor 66. The first sun gear 92A can be formed integrally with the output shaft 66C as a one-piece member. Alternatively, the first sun gear 92A can be formed separately from the output shaft 66C and coupled to the output shaft 66C. The first ring gear 92B is provided on the inner circumference of the second portion 86. The first ring gear 92B can be formed integrally with the second portion 86 or separately from the second portion 86. The first planet gears 92C are arranged between the first sun gear 92A and the first ring gear 92B. The first carrier 92D supports the first planet gears 92C so that the first planet gears 92C integrally orbit around the first sun gear 92A. The first carrier 92D is supported by the fifth bearing 76E, which is provided on the inner circumference of the second portion 86, to be rotatable relative to the second portion 86.

The second reduction mechanism 94 includes a planetary gear mechanism. The second reduction mechanism 94 includes a second sun gear 94A, a second ring gear 94B, a plurality of second planet gears 94C, and a second carrier 94D. The second sun gear 94A is connected to the first carrier 92D and rotated integrally with the first carrier 92D. The second ring gear 94B is provided on the inner circumference of the second portion 86. The second ring gear 94B can be formed integrally with the second portion 86 as a one-piece member or separately from the second portion 86. The second planet gears 94C are arranged between the second sun gear 94A and the second ring gear 94B. The second carrier 94D supports the second planet gears 94C so that the second planet gears 94C integrally orbit around the second sun gear 94A. The second carrier 94D is supported by the sixth bearing 76F, which is provided on the inner circumference of the second portion 86, so as to be rotatable relative to the second portion 86.

The torque of the motor 66 is transmitted to the first gear 96. The first gear 96 includes a first rotational axis C3 that is parallel to the rotational axis C2 of the motor 66. The second gear 98 is engaged with the first gear 96 to transmit torque to the output part 68. The second gear 98 includes a second rotational axis C4 that is parallel to the rotational axis C1 of the crankshaft 64. The first gear 96 and the second gear 98 each include a bevel gear. The first gear 96 is connected to the second carrier 94D and rotated integrally with the second carrier 94D. At least part of the first gear 96 is provided to the first portion 84. The first gear 96 includes a smaller number of teeth than the second gear 98. The first gear 96 and the second gear 98 configure a third reduction mechanism. The second gear 98 is provided on the outer circumference of the output part 68. The first gear 96 and the second gear 98 convert rotation around the first rotational axis C3 of the first gear 96 to rotation around the second rotational axis C4 of the second gear 98 and output the rotation to the output part 68.

The rotation of the motor 66 is reduced in speed by three stages, namely, the first reduction mechanism 92, the second reduction mechanism 94, and the first gear 96 and second gear 98, and then transmitted to the output part 68. The decelerator 70 can reduce the speed of the rotation of the motor 66 with two or less stages or four or more stages and before transmitting the rotation to the output part 68. In the decelerator 70, the number of speed reduction stages and the speed reduction ratio can be changed as required. The structure of the decelerator 70 can also be changed in accordance with the desired speed reduction ratio.

The second one-way clutch 74 is provided to the housing 62. The second one-way clutch 74 is provided to the first portion 84 of the housing 62. The second one-way clutch 74 is provided to a second power transmission path between the motor 66 and the output part 68. Preferably, the second one-way clutch 74 is provided between the inner circumference of the second gear 98 and the outer circumference of the output part 68. The crankshaft 64, the output part 68, and the second gear 98 are coaxial. In case the speed of the rotation of the second gear 98 in the first rotation direction is higher than or equal to the speed of the rotation of the output part 68 in the first rotation direction, the second one-way clutch 74 transmits the rotation of the second gear 98 to the output part 68. In case the speed of the rotation of the second gear 98 in the first rotation direction is lower than or equal to the speed of the rotation of the output part 68 in the first rotation direction, the second one-way clutch 74 does not transmit rotation of the output part 68 to the second gear 98. Preferably, the second one-way clutch 74 is configured by a roller clutch but can be configured by a ratchet clutch.

The detector 78 is provided to the housing 62. The detector 78 detects human driving force input from the crankshaft 64. The detector 78 is provided, for example, on the output part 68 in the first power transmission path at the downstream side of the first one-way clutch 72. Further, the detector 78 is provided, for example, on the output part 68 in the first power transmission path at the upstream side of the second one-way clutch 74. The detector 78 includes a strain sensor or a magnetostrictive sensor. The strain sensor includes a strain gauge. In case the detector 78 includes a strain sensor, the strain sensor is provided on the outer circumference of the output part 68. The detector 78 can include a unit that performs wireless or wired communication. The detector 78 can include a rotation sensor that detects rotation of the crankshaft 64. The communication unit (e.g., a transmitter) is configured to communicate with the electronic controller 80.

The electronic controller 80 is provided to the housing 62. The electronic controller 80 controls the motor 66. The electronic controller 80 controls the motor 66 in accordance with the detection result of the detector 78. The electronic controller 80 controls the motor 66 so that the ratio of the human driving force to the assist force generated by the motor 66 becomes equal to a predetermined ratio. The electronic controller 80 includes a drive circuit. The drive circuit includes an inverter circuit and controls the power supplied from the battery 52 to the motor 66. The electronic controller 80 includes a processor(s) that executes predetermined control programs. The processor includes, for example, a central processing unit (CPU) or a micro-processing unit (MPU). The electronic controller 80 can include one or more microcomputers. The term "electronic controller" as used herein refers to hardware that executes a software program. The electronic controller 80 can further include a memory device and a timer. The memory device stores various control programs and information used for various control processes. The memory device is any computer storage device or any computer readable medium with the sole exception of a transitory, propagating signal. The memory device includes, for example, a non-volatile memory and a volatile memory. Preferably, the electronic controller 80 is accommodated in the second portion 86. The electronic controller 80 is provided adjacent to the motor 66. The electronic controller 80 is provided on the second end 86B of the second portion 86. Preferably, the electronic controller 80 is provided between the motor 66 and the electrical terminal 82 in the direction of the rotational axis C2 of the motor 66. The electronic controller 80 includes one or more circuit boards 81. Preferably, each of the circuit boards 81 is arranged in the housing 62 so that its thickness-wise direction is parallel to the rotational axis C2 of the motor 66.

The electronic controller 80 controls the motor 66 so that the output torque of the motor 66 is smaller than or equal to the maximum output torque. In one example, the maximum output torque of the motor 66 is larger than or equal to 10 Nm and smaller than or equal to 80 Nm. More preferably, the maximum output torque of the motor 66 is larger than or equal to 10 Nm and smaller than or equal to 60 Nm. Further preferably, the maximum output torque of the motor 66 is larger than or equal to 10 Nm and smaller than or equal to 40 Nm. The electronic controller 80 controls the motor 66 so that the output of the motor 66 is smaller than or equal to the maximum output. In one example, the maximum output of the motor 66 is larger than or equal to 100 watts and smaller than or equal to 600 watts. Preferably, the maximum output of the motor 66 is larger than or equal to 100 watts and smaller than or equal to 450 watts. More preferably, the maximum output of the motor 66 is larger than or equal to 100 watts and smaller than or equal to 300 watts.

Figure 12:
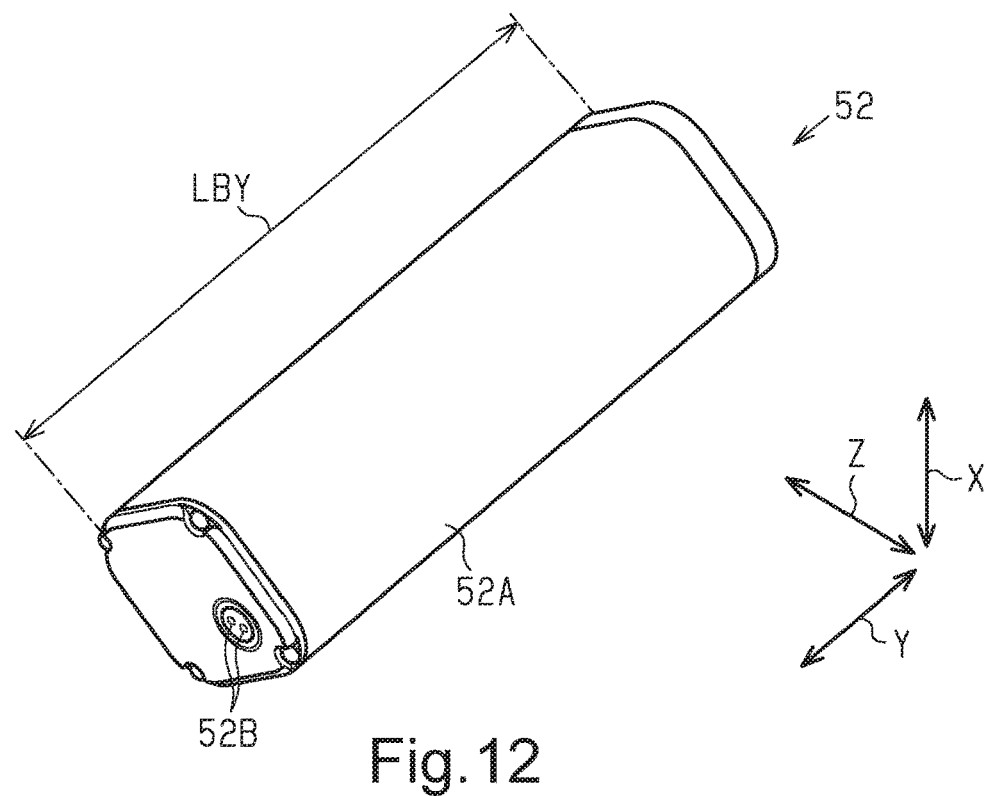
FIG. 12 is a perspective view of a battery of the bicycle illustrated in FIG. 2.
Figure 13:
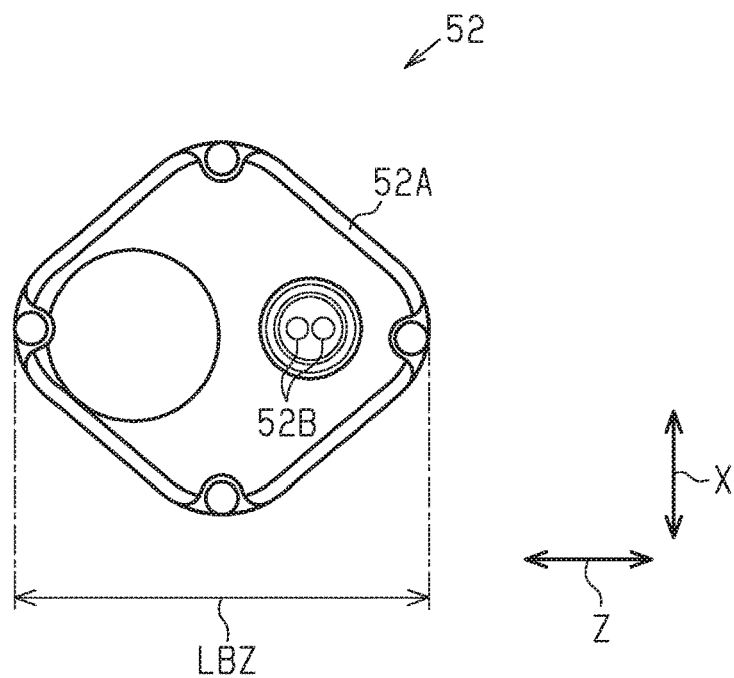
FIG. 13 is a bottom view of the battery illustrated in FIG. 12.

The battery 52 shown in FIGS. 12 and 13 include one or more battery cells. The battery 52 includes a battery housing 52A that accommodates battery cells. The battery housing 52A includes a battery terminal 52B connected to the electrical terminal 82 of the housing 62. The battery 52 supplies power to the motor 66.

The battery 52 is accommodated in the frame 30. The battery 52 is shaped so that it can be accommodated in the down tube 30A of the frame 30. In a direction orthogonal to the rotational axis C2 of the motor 66, the battery 52 includes a maximum dimension LBZ that is preferably smaller than or equal to 75 mm. Preferably, the maximum dimension LBZ of the battery 52 is larger than or equal to 50 mm. In one example, the maximum dimension LBZ of the battery 52 in the direction orthogonal to the rotational axis C2 of the motor 66 is substantially equal to the maximum dimension LZ2 of the second portion 86 of the housing 62 (refer to FIG. 10) in the direction orthogonal to the rotational axis C2 of the motor 66 and parallel to the rotational axis C1 of the crankshaft 64. In a direction parallel to the rotational axis C2 of the motor 66, the battery 52 has a maximum dimension LBY that is preferably smaller than or equal to 400 m. Preferably, the maximum dimension LBY of the battery 52 in the direction parallel to the rotational axis C2 of the motor 66 is smaller than or equal to 290 mm. Preferably, the maximum dimension LBY of the battery 52 in the direction parallel to the rotational axis C2 of the motor 66 is larger than or equal to 10 mm. In one example, the maximum dimension LBY of the battery 52 in the direction parallel to the rotational axis C2 of the motor 66 is longer than the maximum dimension LY of the drive unit 60 in the direction parallel to the rotational axis C2 of the motor 66 (refer to FIG. 8). The maximum dimension LBY of the battery 52 in the direction parallel to the rotational axis C2 of the motor 66 is longer than the maximum dimension LBZ of the battery 52 in the direction orthogonal to the rotational axis C2 of the motor 66. Preferably, in a direction parallel to the rotational axis C2 of the motor 66, the distance from the rotational axis C1 of the crankshaft 64 of the bicycle component 50 to the part of the battery 52 farthest from the crankshaft 64 is 500 mm. In one example, the distance in the direction parallel to the rotational axis C2 of the motor 66 from the rotational axis C1 of the crankshaft 64 of the bicycle component 50 to the part of the battery 52 farthest from the crankshaft 64 is equal to the distance obtained by adding the maximum dimension LBY of the battery 52 to the distance LA to the drive unit 60.

Referring to FIG. 2, in a state in which the second portion 86 of the housing 62 and the battery 52 are arranged next to each other in a direction parallel to the rotational axis C2 of the motor 66 in a state in which the battery 52 is coupled to the second portion 86 in an attachable and detachable manner, at least part of the second portion 86 and at least part of the battery 52 are accommodated in the frame 30.

Figure 14:
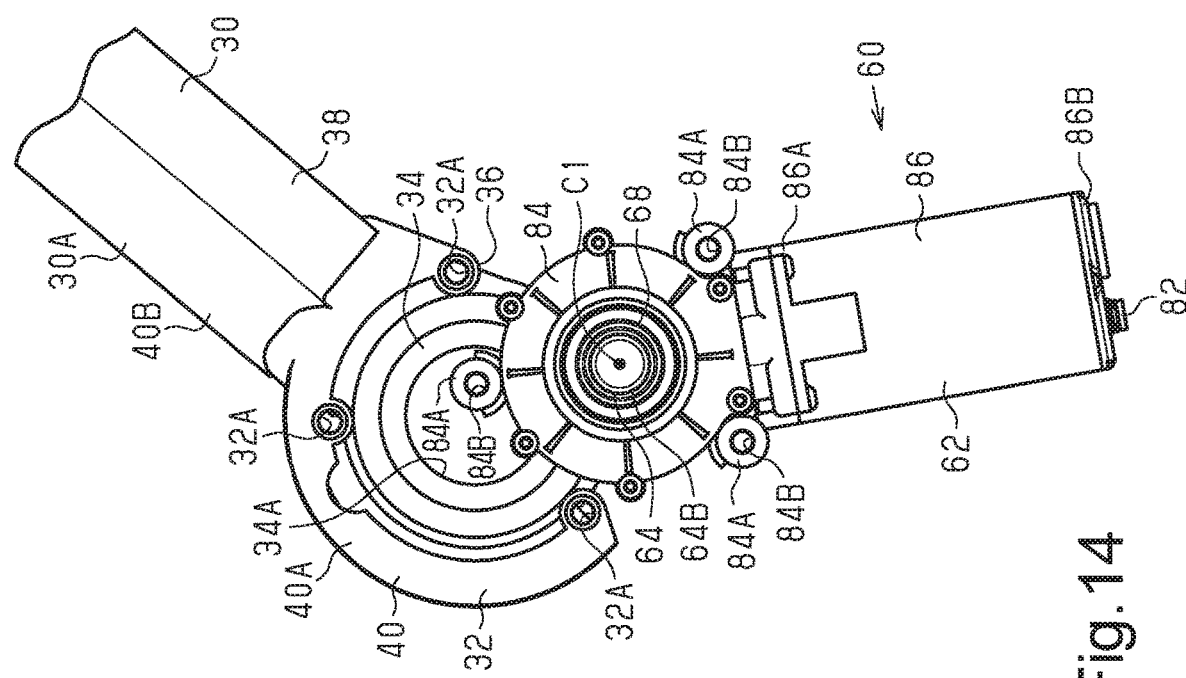
FIG. 14 is a right side elevational view of a portion of the bicycle frame and the bicycle drive unit showing a first step of a method for mounting the bicycle drive unit in accordance with the illustrated embodiment.

With reference to FIGS. 14 and 19, a method for mounting the drive unit 60 on the frame 30 will now be described. FIGS. 14 to 19 show the frame 30 without the seat tube 30D and the chainstay 30F.

The method for mounting the drive unit 60 includes a first step and a second step. The method for mounting the drive unit 60 further includes a third step and a fourth step. In the first step, the first portion 84 of the housing 62 is arranged at a position for mounting the first portion 84 on the frame 30. In the first step, the drive unit 60 is moved in the direction in which the crankshaft 64 extends. In the first step, the first end 64A of the crankshaft 64 is inserted into the through hole 34A of the frame 30. In the first step, the drive unit 60 is moved in a direction intersecting the sideward direction of the frame 30 of the bicycle 10.

Figure 15:
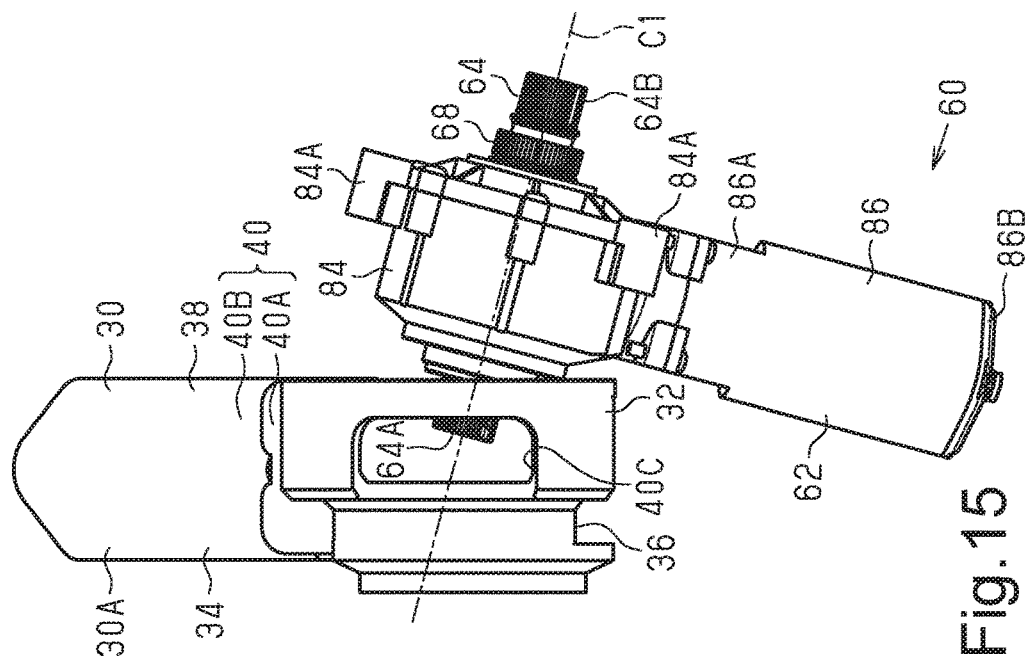
FIG. 15 is a rear elevational view showing a second step of the method for mounting the bicycle drive unit in accordance with the illustrated embodiment.

As shown in FIGS. 14 and 15, in the first step, the drive unit 60 is moved from the lower and outer side with respect to the sideward direction of the bicycle 10 toward the joint 40 of the mounting portion 32. In this case, the drive unit 60 is moved in a direction intersecting the sideward direction of the frame 30 of the bicycle 10.

Figure 16:
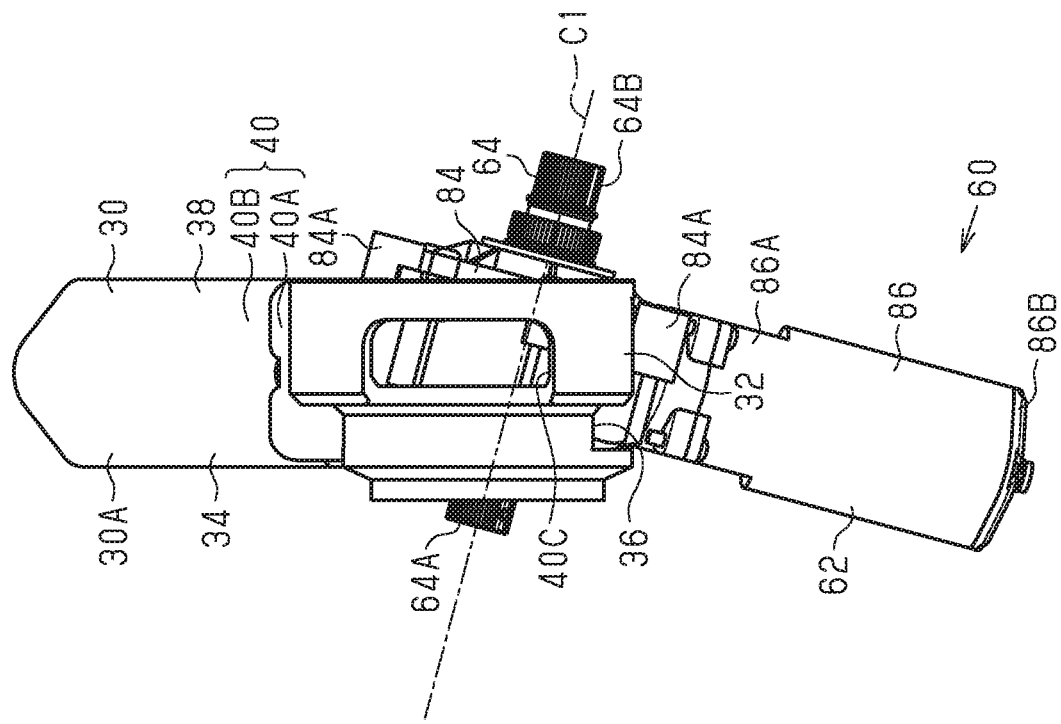
FIG. 16 is a rear elevational view showing a third step of the method for mounting the bicycle drive unit in accordance with the illustrated embodiment.

As shown in FIG. 16, in the first step, the drive unit 60 is further moved parallel from the state of FIG. 15 in a direction intersecting the sideward direction of the frame 30 to insert the first end 64A of the crankshaft 64 into the through hole 34A.

Figure 17:
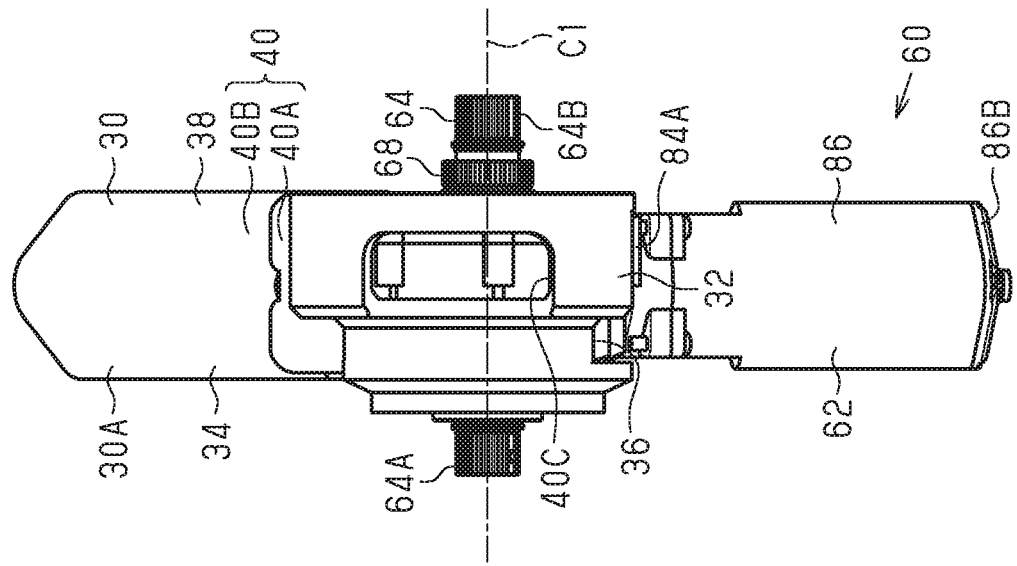
FIG. 17 is a rear elevational view showing a fourth step of the method for mounting the bicycle drive unit in accordance with the illustrated embodiment.

As shown in FIGS. 17 and 18, in the first step, the drive unit 60 is moved so that the rotational axis C1 of the crankshaft 64 becomes parallel to the sideward direction of the bicycle 10. This arranges the first portion 84 of the drive unit 60 in a region surrounded by the joint 40.

As shown in FIGS. 18 and 19, in a second step, after the first step, the housing 62 is rotated from the state in FIG. 18 (end of the first step and the beginning of the second step) about an axis parallel to the rotational axis C1 of the crankshaft 64, and the second portion 86 of the housing 62 is inserted into the opening 36 of the frame 30 as seen in FIG. 19. In the second step, the second portion 86 is inserted into the opening 36, and at least part of the second portion 86 is arranged in the accommodation compartment. In the second step, the drive unit 60 is arranged in the mounting portion 32 so that the first coupling portions 84B of the housing 62 are in correspondence with the second coupling portions 32A of the frame 30.

In a third step, after the second step, the first coupling portions 84B are coupled to the second coupling portions 32A. In the third step, the first coupling portions 84B are coupled to the second coupling portions 32A with the bolts B2, which are shown in FIG. 11. In the third step, the coupling member 44, which is shown in FIG. 11, is coupled to the third coupling portion 88C, and the mounting portion 32 of the frame 30 is held between the coupling member 44 and the widthwise end face of the first side surface 88 of the housing 62. The bolts B2 sandwich the housing 62 between the coupling member 44 and the frame 30 and couple the housing 62 to the frame 30.

In a fourth step, after the third step, the cover 42 (refer to FIG. 2) is attached to at least partially cover at least the part of the second portion 86 of the housing 62 that is exposed from the opening. In the fourth step, the cover 42 is attached to at least one of the frame 30 and the drive unit 60. The cover 42 can be coupled to only the frame 30, only the drive unit 60, or both the frame 30 and the drive unit 60 with the bolts B1. In the fourth step, the bolts B1 attach the cover 42 to at least one of the frame 30 and the drive unit 60. Here, in the illustrated embodiment, the cover 42 is coupled to the frame 30 with the bolts B1.

In one example, preferably, the battery 52 is arranged in the accommodation compartment 30S of the frame 30 before mounting the drive unit 60 on the frame 30. In this case, the battery terminal 52B of the battery 52 and the electrical terminal 82 of the drive unit 60 are connected after the third step and before the fourth step. In a further example, the second opening portion 36B of the opening 36 is extended to where the battery 52 is arranged, and the first to fourth steps are performed on the bicycle component 50 in a state in which the battery 52 and the drive unit 60 are connected to mount the drive unit 60 on the frame 30.

Modifications

The description related with the above embodiment exemplifies an applicable form of a bicycle drive unit mounting method and a bicycle frame according to the present disclosure and is not intended to limit the forms. In addition to the embodiment described above, the bicycle drive unit mounting method and bicycle frame according to the present disclosure is applicable to, for example, modifications of the above embodiments that are described below and combinations of at least two of the modifications that do not contradict each other.

Figure 20:
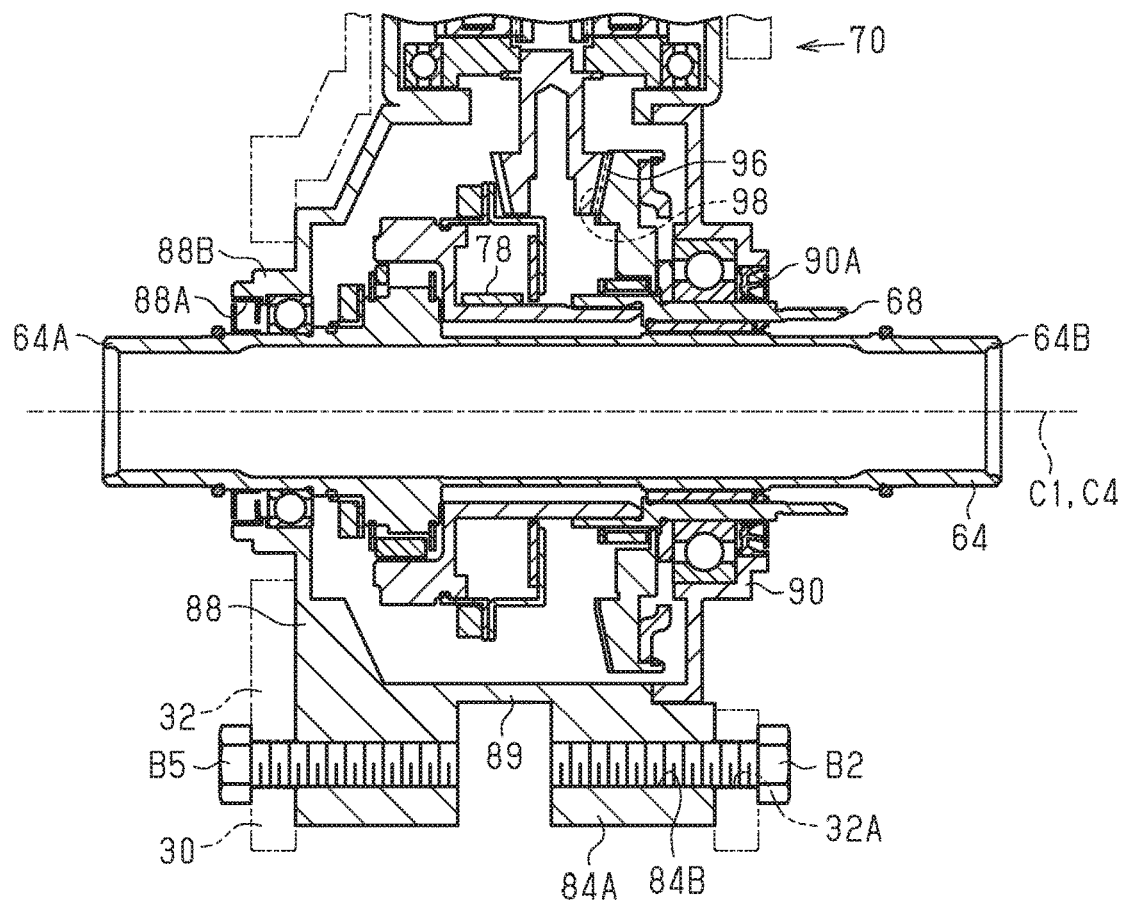
FIG. 20 is a partially, cross-sectional view of a bicycle drive unit of a first modification.

The structure for mounting the drive unit 60 on the frame 30 can be changed as required. For example, as shown in FIG. 20, instead of the coupling member 44, typical bolts B5 can be used to couple the drive unit 60 to the frame 30.

Figure 21:
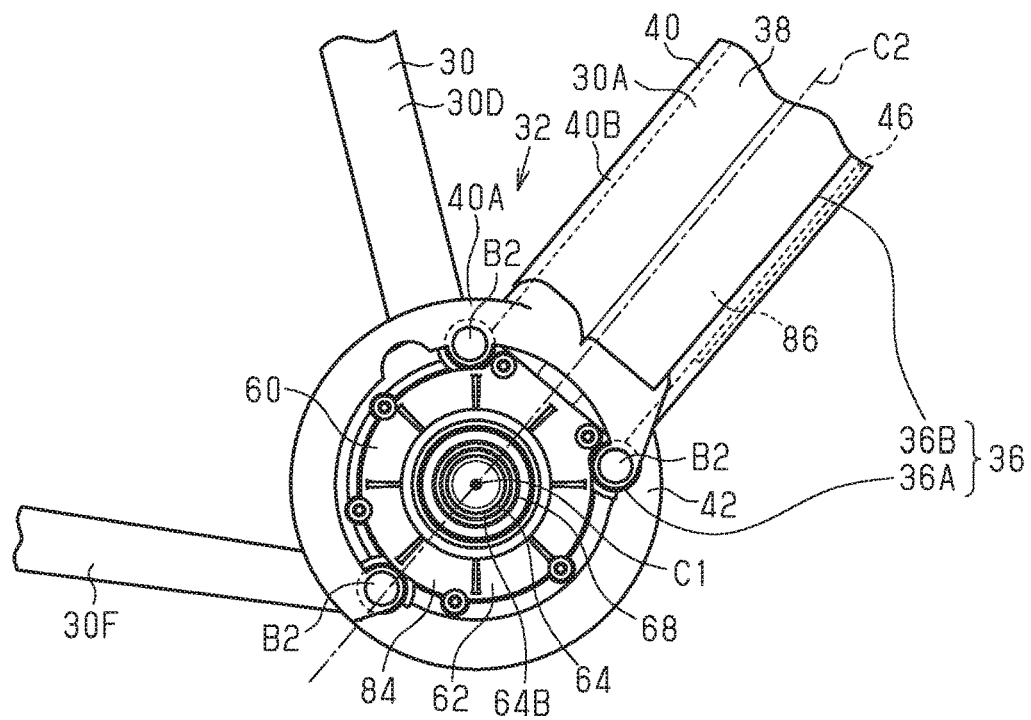
FIG. 21 is a right side elevational view showing the vicinity of the crankshaft in a bicycle of a second modification.

As shown in FIG. 21, the cover 42 can be attached to at least one of the frame 30 and the drive unit 60 by a hook-and-loop fastener 46. In this case, in the fourth step, the cover 42 is attached to at least one of the frame 30 and the drive unit 60 by the hook-and-loop fastener 46. The cover 42 can be attached to only the frame 30, only the drive unit 60, or both the frame 30 and the drive unit 60 with a hook-and-loop fastener 46.

The maximum dimension LX1 of the first portion 84 in a direction parallel to the rotational axis C1 of the crankshaft 64 can be smaller than or equal to a maximum dimension LX2 of the second portion 86 in the direction parallel to the rotational axis C1 of the crankshaft 64.

The motor 66 can be provided to the housing 62 so that the rotational axis C2 of the motor 66 is inclined relative to the rotational axis C1 of the crankshaft 64. Further, the motor 66 can be provided to the housing 62 so that the rotational axis C2 of the motor 66 and the rotational axis C1 of the crankshaft 64 are not included in the same plane.

Figure 22:
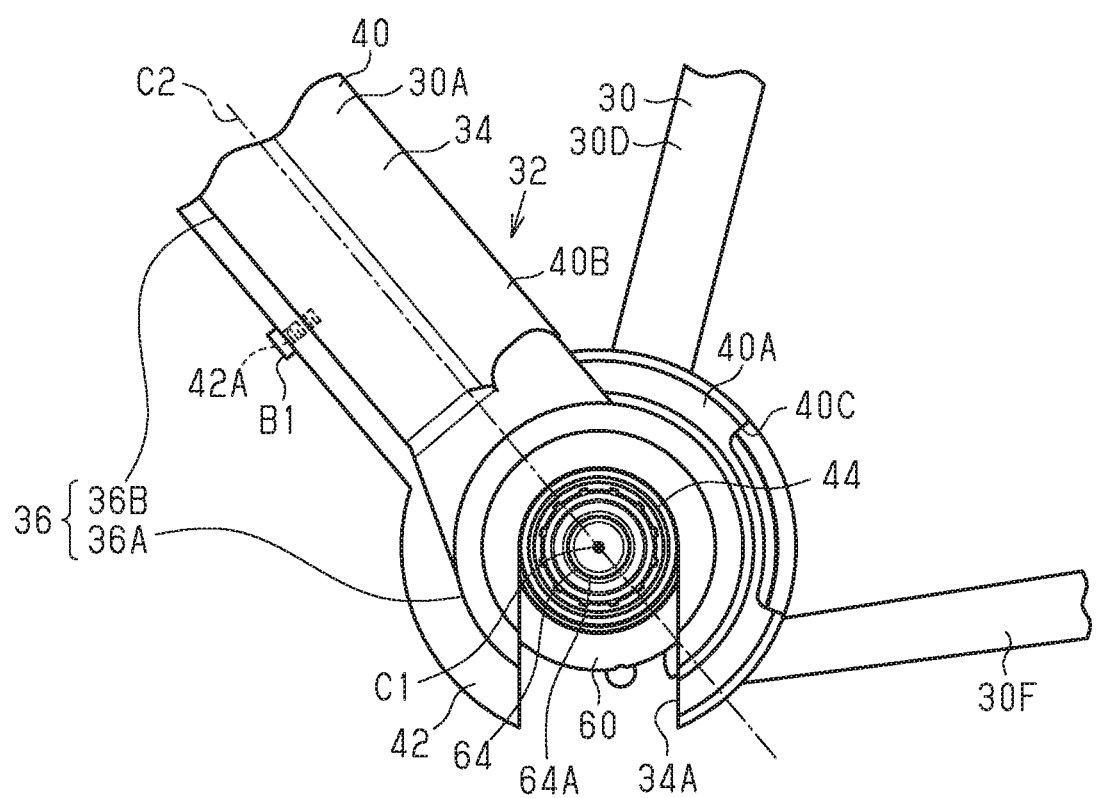
FIG. 22 is a left side elevational view showing the vicinity of the crankshaft in a bicycle of a third modification.

As shown in FIG. 22, the through hole 34A can be partially open in a direction intersecting the sideward direction of the bicycle 10. For example, the through hole 34A is at least partially open toward the lower side of the bicycle 10. In this case, in the first step, the housing is moved in a direction orthogonal to the sideward direction of the bicycle 10 to insert the crankshaft 64 into the through hole 34A.

Instead of or in addition to the lower side of the bicycle 10, the through hole 34A can be open toward the front side or rear side of the bicycle 10. The through hole 34A can be shaped in any manner as long as the through hole 34A allows for insertion of the first portion 84 of the drive unit 60.

The opening 36 can be open toward the upper side of the bicycle 10. Instead of or in addition to the down tube 30A, the mounting portion 32 can be provided on at least one of the chainstay 30F and the seat tube 30D. The mounting portion 32 can be provided on only the chainstay 30F, only the seat tube 30D, or both the chainstay 30F and the seat tube 30D instead of or in addition to the down tube 30A.

The housing 62 can be mounted on the outer side of the frame 30. The output part 68 can be configured to allow for the mounting of a pulley. In this case, the front rotational body 26 and the rear rotational body 28 each include a pulley, and the front rotational body 26 and the rear rotational body 28 are connected by a belt.

In the first step, the drive unit 60 can be moved parallel to the sideward direction of the bicycle 10. In this case, the second side wall 38 is configured so that part of the housing, especially, the first coupling portions 84B, does not contact the second side wall 38. For example, the second side wall 38 can be partially cut out.

What is claimed is:

1. A bicycle drive unit comprising:
a housing configured to be mounted on a frame of a bicycle, the housing including a first portion and a second portion;
a crankshaft provided to the first portion of the housing, the crankshaft having a rotational axis; and
a propulsion assist motor provided to the second portion of the housing and configured to assist propulsion of the bicycle,
the propulsion assist motor including a rotor arranged to rotate about a rotational axis extending in a direction intersecting a direction in which the crankshaft extends,
the rotational axis of the rotor and the rotational axis of the crankshaft lying in the same plane,
the second portion having a maximum dimension of smaller than or equal to 75 mm in a direction orthogonal to the rotational axis of the propulsion assist motor.

2. The bicycle drive unit according to claim 1, wherein the housing is configured to be accommodated in at least a part of the frame.

3. The bicycle drive unit according to claim 1, wherein the second portion has a minimum dimension of larger than or equal to 40 mm in a direction orthogonal to the rotational axis of the propulsion assist motor.

4. The bicycle drive unit according to claim 3, wherein the second portion has a first dimension in a first direction that differs from a second dimension in a second direction extending perpendicular to the first direction on a plane orthogonal to the rotational axis of the propulsion assist motor.

5. The bicycle drive unit according to claim 4, wherein the first direction is parallel to the direction in which the crankshaft extends, and
the first dimension is smaller than the second dimension.

6. The bicycle drive unit according to claim 4, wherein a ratio of the second dimension to the first dimension is larger than 1 and smaller than or equal to 1.5.

7. The bicycle drive unit according to claim 1, wherein the propulsion assist motor has a maximum output torque of larger than or equal to 10 Nm and smaller than or equal to 80 Nm.

8. The bicycle drive unit according to claim 7, wherein the maximum output torque of the propulsion assist motor is larger than or equal to 10 Nm and smaller than or equal to 60 Nm.

9. The bicycle drive unit according to claim 8, wherein the maximum output torque of the propulsion assist motor is larger than or equal to 10 Nm and smaller than or equal to 40 Nm.

10. The bicycle drive unit according to claim 1, wherein the propulsion assist motor has a maximum output of larger than or equal to 100 watts and smaller than or equal to 600 watts.

11. The bicycle drive unit according to claim 10, wherein the maximum output of the propulsion assist motor is larger than or equal to 100 watts and smaller than or equal to 450 watts.

12. The bicycle drive unit according to claim 11, wherein the maximum output of the propulsion assist motor is larger than or equal to 100 watts and smaller than or equal to 300 watts.

13. The bicycle drive unit according to claim 1, wherein the rotational axis of the propulsion assist motor is orthogonal to the rotational axis of the crankshaft.

14. The bicycle drive unit according to claim 1, further comprising
an output part provided to the housing, the crankshaft and the propulsion assist motor being operatively coupled to the output part to transmit torque from the crankshaft and the propulsion assist motor to the output part.

15. The bicycle drive unit according to claim 14, wherein the output part is coaxial with the crankshaft and at least partially exposed from the housing.

16. The bicycle drive unit according to claim 14, wherein the output part is configured to mount one or more sprockets.

17. The bicycle drive unit according to claim 16, wherein the one or more sprockets each include at least thirty teeth but no more than fifty-five teeth.

18. The bicycle drive unit according to claim 14, further comprising
a first one-way clutch provided to the housing in a first power transmission path between the crankshaft and the output part.

19. The bicycle drive unit according to claim 18, wherein the first one-way clutch is provided to the first portion of the housing.

20. The bicycle drive unit according to claim 14, further comprising
   a decelerator provided to the housing and connected to the propulsion assist motor.

21. The bicycle drive unit according to claim 14, further comprising
   a second one-way clutch provided to a second power transmission path between the propulsion assist motor and the output part.

22. The bicycle drive unit according to claim 21, wherein the second one-way clutch is provided to the first portion of the housing.

23. The bicycle drive unit according to claim 1, further comprising
   an electronic controller provided to the housing and operatively coupled to the propulsion assist motor.

24. The bicycle drive unit according to claim 23, further comprising:
   a detector provided to the housing and configured to detect a human driving force input from the crankshaft,
   the electronic controller being configured to control the propulsion assist motor in accordance with a detection result of the detector.

25. The bicycle drive unit according to claim 1 further comprising
   an electrical terminal provided to the housing and electrically connected to a battery that supplies power to the propulsion assist motor.

26. The bicycle drive unit according to claim 25, wherein the second portion of the housing includes a first end and a second end in a direction parallel to the rotational axis of the propulsion assist motor,
   the first end is connected to the first portion, and
   the electrical terminal is provided on the second end.

27. The bicycle drive unit according to claim 1, wherein the second portion has a maximum dimension of smaller than or equal to 60 mm in the direction orthogonal to the rotational axis of the propulsion assist motor.

28. A bicycle drive unit comprising:
   a housing configured to be mounted on a frame of a bicycle, the housing including a first portion and a second portion;
   a crankshaft provided to the first portion of the housing;
   a propulsion assist motor provided to the second portion of the housing and configured to assist propulsion of the bicycle, the propulsion assist motor including a rotational axis extending in a direction intersecting a direction in which the crankshaft extends;
   an output part provided to the housing, the crankshaft and the propulsion assist motor being operatively coupled to the output part to transmit torque from the crankshaft and the propulsion assist motor to the output part; and
   a decelerator provided to the housing and connected to the propulsion assist motor,
   the second portion having a maximum dimension of smaller than or equal to 75 mm in a direction orthogonal to the rotational axis of the propulsion assist motor,
   the decelerator including a first gear, to which the torque of the propulsion assist motor is transmitted, and a second gear engaged with the first gear to transmit the torque to the output part,
   the first gear including a first rotational axis parallel to the rotational axis of the propulsion assist motor; and
   the second gear including a second rotational axis parallel to the rotational axis of the crankshaft.

* * * * *